(12) United States Patent
Park et al.

(10) Patent No.: US 9,416,849 B2
(45) Date of Patent: Aug. 16, 2016

(54) ACTUATOR OF VEHICLE

(71) Applicant: HYUNDAI MOBIS CO., LTD., Seoul (KR)

(72) Inventors: Kyung Ryul Park, Yongin-si (KR); Young Kwang Kim, Yongin-si (KR); Jun Sung Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 45 days.

(21) Appl. No.: 14/149,912

(22) Filed: Jan. 8, 2014

(65) Prior Publication Data

US 2015/0151604 A1  Jun. 4, 2015

(30) Foreign Application Priority Data

Nov. 29, 2013 (KR) .......................... 10-2013-0147834

(51) Int. Cl.
*F16H 1/28* (2006.01)
*B60G 21/055* (2006.01)

(52) U.S. Cl.
CPC .............. *F16H 1/28* (2013.01); *B60G 21/0555* (2013.01); *B60G 21/0558* (2013.01); *B60G 2202/42* (2013.01); *B60G 2202/442* (2013.01); *B60G 2204/419* (2013.01); *B60G 2206/427* (2013.01)

(58) Field of Classification Search
CPC .............. B60G 21/055; B60G 21/005; B60G 2202/442; B60G 21/0558; B60G 2206/427; B60G 2202/42; B60G 2204/419; F16H 1/28
USPC .................................................. 280/124.106
See application file for complete search history.

(56) References Cited

U.S. PATENT DOCUMENTS

| | | | | |
|---|---|---|---|---|
| 6,149,166 | A | * | 11/2000 | Struss et al. ............... 280/5.511 |
| 6,255,751 | B1 | * | 7/2001 | Hoffmann .............. H02K 7/083 |
| | | | | 310/40 MM |
| 7,648,166 | B2 | * | 1/2010 | Maripudi ...................... 280/740 |
| 2005/0236793 | A1 | | 10/2005 | Taneda et al. |
| 2007/0249457 | A1 | * | 10/2007 | Tesar ............................ 475/180 |
| 2008/0257088 | A1 | * | 10/2008 | Tesar .............................. 74/438 |

(Continued)

FOREIGN PATENT DOCUMENTS

CN    1746043 A    3/2006
CN    201633473 U    11/2010

(Continued)

OTHER PUBLICATIONS

Kim, Y-K. KR 10-2015-002165 Machine English Translation.*

(Continued)

*Primary Examiner* — Karen Beck
(74) *Attorney, Agent, or Firm* — NSIP Law

(57) ABSTRACT

Disclosed is a backlash reduction mechanism that can stably control the position of a vehicle, using a backlash reduction unit for reducing backlash of a reduction gear in a vehicle capable of actively controlling roll, and an actuator of a vehicle equipped with the backlash reduction mechanism. Further, the present invention provides a torsion damper capable of stably controlling the position of a vehicle capable of controlling roll, and an actuator of a vehicle equipped with the torsion damper. Further, the present invention provides a coaxial-aligning part that compensates for left-right inclination through stabilizers by generating a torsional force in a vehicle capable of actively controlling roll, and an actuator of a vehicle equipped with the coaxially-aligning part.

7 Claims, 26 Drawing Sheets

(56) References Cited

U.S. PATENT DOCUMENTS

| | | | |
|---|---|---|---|
| 2010/0187778 A1 | 7/2010 | Grau et al. | |
| 2013/0291664 A1* | 11/2013 | Freund | B60G 21/0555 74/89 |
| 2015/0151604 A1* | 6/2015 | Park et al. | 280/124.106 |
| 2016/0089951 A1* | 3/2016 | Jeon | B60G 21/0555 280/5.508 |

FOREIGN PATENT DOCUMENTS

| | | | | |
|---|---|---|---|---|
| EP | 10 2006 008 368 A1 | 5/2007 | | |
| JP | 2001-173733 A | 6/2001 | | |
| JP | 2008-049778 A | 3/2008 | | |
| KR | 1998-0052232 U | 10/1998 | | |
| KR | 10-2008-0040058 | 5/2008 | | |
| KR | 10-0842341 B1 | 6/2008 | | |
| KR | 10-2009-0046488 A | 5/2009 | | |
| KR | 10-2011-0076832 | 7/2011 | | |
| KR | 10-2011-0125513 A | 11/2011 | | |
| KR | 10-2015-0022165 | * 8/2013 | | B60G 17/015 |
| KR | 10-2015-0060257 | * 11/2013 | | B60G 17/015 |

OTHER PUBLICATIONS

Park, Y-G, KR 10-2013-0060257 Machine English Translation.*
Korean Office Action mailed Dec. 15, 2014 in the Korean Intellectual Patent Office in corresponding Korean Application No. 10-2013-0147834. (6 Pages).
Chinese Office Action issued on May 30, 2016 in counterpart Chinese Application No. 201410320461.7. (6 pages in Chinese).

* cited by examiner

[FIG. 23B

ACTUATOR OF VEHICLE

CROSS-REFERENCE TO RELATED APPLICATIONS

This application claims priority to and the benefit of Korean Patent Application No. 10-2013-0147834 filed in the Korean Intellectual Property Office on Nov. 29, 2013, the entire contents of which are incorporated herein by reference.

TECHNICAL FIELD

ARSs (Active Roll Stabilizer) are devices increasing safety and riding comfort of a vehicle by changing stiffness of a stabilizer bar. Those ARSs increase stability by suppressing roll of a vehicle that is turning or control the transverse position of a vehicle by distributing roll stiffness of the front/rear wheels. The ARSs can improve riding comfort by reducing a shock from the road surface, by decreasing the stiffness of a stabilizer while a vehicle travels straight. The present invention relates to an actuator that is used in the ARS.

BACKGROUND ART

Stabilizer bars are a kind of torsion springs that keep a vehicle balanced by suppressing a roll motion of the car body. Accordingly, stabilizer bars are used as independent suspensions of vehicles to reduce inclination due to a centrifugal force when vehicles turn left or right or travel on a rough road. Mounting a stabilizer on a vehicle can improve riding comfort in traveling through a torsion angle.

Recently, actuators are used to control movement of a link or the center of a stabilizer. Actuators are mechanical parts that convert electric energy of an electric motor, a hydraulic motor, and an electromagnet etc. into a mechanical force.

However, when impact is applied to the inside of actuators due to rapid movement of wheels of a vehicle traveling on an abnormal road, it may have a bad influence on durability of the actuators. Accordingly, rubber bushes were inserted to attenuate impact in the related art, but durability of the rubber bushes is low and there is difficulty in performance tuning.

US Patent Application Publication No. 2010-0187778 discloses an electric active roll control apparatus. However, the apparatus uses a differential planetary gear and a multi-step planetary gear as power transmission units, so the left and right stabilizer bars are spaced by gear backlash in this structure.

Korean Patent Application Laid-Open No. 2011-0076832 discloses an actuator for a vehicle. However, although this actuator can adjust exhaust pressure by selectively opening/closing a waste gate valve, it cannot stably control the position of a vehicle.

On the other hand, the active stabilizer bars of the related art are composed of left and right stabilizers. Korean Patent Application Laid-Open No. 2008-0040058 discloses such a stabilizer. However, the active stabilizer bar has a problem in that coaxial precision is poor, when the co-axis between the left and right stabilizers or various gear assemblies are arranged.

SUMMARY OF THE INVENTION

The present invention has been made in an effort to provide a backlash reduction mechanism that can stably control the position of a vehicle by reducing backlash of a reduction gear in a vehicle capable of actively controlling roll, and an actuator of a vehicle equipped with the backlash reduction mechanism.

The present invention provides a torsion damper capable of stably controlling the position of a vehicle capable of controlling roll, and an actuator of a vehicle equipped with the torsion damper.

The present invention provides a coaxial-aligning part that compensates for left-right inclination through stabilizers by generating a torsional force in a vehicle capable of actively controlling roll, and an actuator of a vehicle equipped with the coaxially-aligning part.

However, the objects of the present invention are not limited to those stated above and other objects not stated above may be clear to those skilled in the art from the following description.

An exemplary embodiment of the present invention provides an actuator of a vehicle, including: a fixed stabilizer bar fixed to a side of a housing; a rotary stabilizer bar rotatably coupled to the other side of the housing; a multi-step planetary gear set including a sun gear, a planetary gear, and a carrier and disposed in the housing; a motor including a stator generating a magnetic force when power is supplied, and a rotor rotated by the magnetic force, and disposed in the housing; and a backlash reduction mechanism controlling backlash of a reduction gear for reducing a gap between the fixed stabilizer bar and the rotary stabilizer bar by applying a load to the sun gear.

The backlash reduction mechanism may include: a lock nut fitted on one end of the fixed stabilizer bar; a push rod being in close contact with one end of the sun gear through the motor; and a spring being in contact with the lock nut at one end and with the push rod at the other end and applying a load by an elastic force to the lock nut and the push rod.

The backlash reduction mechanism may further include a ball inserted between the lock nut and the spring and supporting rotation of the push rod.

The actuator of a vehicle may control the position of a vehicle, connecting the fixed stabilizer bar coupled to a wheel at a side of the vehicle with the rotary stabilizer bar coupled to the wheel at the other side. The rotary stabilizer bar is fitted on the shaft inside the fixed stabilizer bar by a bearing.

The multi-step planetary gear set may be connected to the rotary stabilizer bar in the housing and the motor may be disposed between the fixed stabilizer and the multi-step planetary gear set in the housing.

The carrier may fix the planetary gear and may be supported by a bearing.

Another exemplary embodiment of the present invention provides a backlash reduction mechanism including: a lock nut fitted on one end of a fixed stabilizer bar fixed to one side of a housing; a push rod disposed in the housing through a motor, which is disposed in the housing and includes a stator generating a magnetic force when power is supplied and a rotor rotated by the magnetic force, in contact with one end of a sun gear of the planetary gear set; and a spring being in contact with the lock nut at one end and with the push rod at the other end and applying a load by an elastic force to the lock nut and the push rod.

The backlash reduction mechanism may further include a ball inserted between the lock nut and the spring and supporting rotation of the push rod.

Yet another exemplary embodiment of the present invention provides an actuator of a vehicle, including: a fixed stabilizer bar fixed to a side of a housing; a rotary stabilizer bar rotatably coupled to the other side of the housing; a multi-step planetary gear set including a sun gear, a planetary gear, and a carrier and disposed in the housing; a motor including a stator generating a magnetic force when power is supplied, and a rotor rotated by the magnetic force, and disposed in the housing; and a torsion damper having a damping function at the other side of the housing where the rotary stabilizer is coupled.

The carrier can be rotated in one direction and has first protrusions longitudinally extending at predetermined intervals on the inner side.

The torsion damper may include: a hub having a pipe-shaped body and second protrusions formed on the outer side of the body and fitted in grooves between the first protrusions; a rubber damper having damping portions inserted in the spaces defined by the grooves between the first protrusions and the second protrusions; and springs fitted in through-holes of the damping portions.

The rubber damper may have at least one protrusion formed on the surfaces of the damping portions which are in contact with the first protrusions or the second protrusions.

The actuator of a vehicle may further include at least one of a circlip fixing the hub to the rotary stabilizer bar, a locking nut closing the gap defined by coupling of the housing and the rotary stabilizer bar, and a seat closing the gap defined by coupling of the torsion damper and the rotary stabilizer bar.

The carrier may fix the planetary gear and may be supported by a bearing.

Torque generated by the motor may be transmitted to the rotary stabilizer bar sequentially through the carrier and the hub.

The actuator of a vehicle may control the position of a vehicle, connecting the fixed stabilizer bar coupled to a wheel at a side of the vehicle with the rotary stabilizer bar coupled to the wheel at the other side.

Another exemplary embodiment of the present invention provides a torsion damper that damps an actuator of a vehicle, which controls the position of a vehicle on a line connecting a fixed stabilizer bar coupled to a wheel at one side of the vehicle and a rotary stabilizer bar coupled to a wheel at the other side, using at least one of a spring, a rubber, and a hub.

The torsion damper may include: a hub having a pipe-shaped body and second protrusions formed on the outer side of the body and fitted in grooves between the first protrusions formed on the inner side of the carrier fixing the planetary gear in the actuator of a vehicle; a rubber damper having damping portions inserted in the spaces defined by the grooves between the first protrusions and the second protrusions; and springs fitted in through-holes of the damping portions.

Another exemplary embodiment of the present invention provides an actuator of a vehicle, which includes: a fixed stabilizer bar fixed to a side of a housing; a rotary stabilizer bar rotatably coupled to the other side of the housing; a multi-step planetary gear set including a sun gear, a planetary gear, and a carrier and disposed in the housing; a motor including a stator generating a magnetic force when power is supplied, and a rotor rotated by the magnetic force, and disposed in the housing; and a coaxially-aligning portion having a predetermined coaxial degree between the sun gears of the multi-step planetary gear set.

The coaxially-aligning part may have the coaxial degree obtained by forming inclinations or wedges.

The planetary gear set may include: a first gear close to the motor; a third gear being in close contact with one end of the rotary stabilizer bar; and a second gear disposed between the first gear and the second gear, in which the first gear, the second gear, and the third gear may be a helical gear, a helical gear, and a spur gear, respectively, or a helical gear, a spur gear, and a spur gear, respectively.

Another exemplary embodiment of the present invention provides an actuator of a vehicle including: a fixed stabilizer bar fixed to a side of a housing; a rotary stabilizer bar rotatably coupled to the other side of the housing; a multi-step planetary gear set including a sun gear, a planetary gear, and a carrier and disposed in the housing; and a motor including a stator generating a magnetic force when power is supplied, and a rotor rotated by the magnetic force, and disposed in the housing, and the actuator may further include at least one of a backlash reduction mechanism controlling backlash of a reduction gear for reducing a gap between the fixed stabilizer bar and the rotary stabilizer bar by applying a load to the sun gear, a torsion damper having a damping function at the other side of the housing where the rotary stabilizer bar is coupled; and a coaxially-aligning part having a predetermined coaxial degree between the sun gears of the multi-step planetary gear set.

Another exemplary embodiment of the present invention provides an apparatus for controlling the position of a vehicle, including: an actuator that connects a fixed stabilizer bar connected to a wheel at one side of the vehicle with a rotary stabilizer bar connected to a wheel at the other side of the vehicle and controls the position of the vehicle; a first electronic control unit that detects a roll angle of the vehicle on the basis of sensing information from sensors on the vehicle while the vehicle travels; and a second electronic control unit that calculates torque for compensating the roll angle and controls the actuator on the basis of the torque.

The actuator may include: a fixed stabilizer bar fixed to a side of a housing; a rotary stabilizer bar rotatably coupled to the other side of the housing; a multi-step planetary gear set including a sun gear, a planetary gear, and a carrier and disposed in the housing; and a motor including a stator generating a magnetic force when power is supplied, and a rotor rotated by the magnetic force, and disposed in the housing.

The rotary stabilizer bar is fitted on the shaft inside the fixed stabilizer bar by a bearing.

The multi-step planetary gear set may be connected to the rotary stabilizer bar in the housing and the motor may be disposed between the fixed stabilizer and the multi-step planetary gear set in the housing.

The apparatus for controlling the position of a vehicle further include: an encoder controlling the motor and disposed between the motor and the fixed stabilizer bar in the housing; and a position sensor that is a sensor measuring a position and mounted on the rotary stabilizer bar.

The first electronic control unit may use the speed of the vehicle, the acceleration of the vehicle, and the yaw rate of the vehicle, and the steering wheel angle of the vehicle, as the sensing information.

The first electronic control unit may detect a torsion angle generated when the vehicle turns, from as the roll angle.

Another exemplary embodiment of the present invention provides a method of controlling the position of a vehicle, including: obtaining sensing information from sensors on the vehicle while the vehicle travels; detecting a roll angle of the vehicle on the basis of the sensing information; calculating torque for compensating the detected roll angle; and controlling an actuator, which is disposed between a fixed stabilizer bar connected to a wheel at one side of the vehicle and a rotary stabilizer bar connected to a wheel at the other side of the vehicle, using the torque.

The obtaining of sensing information may obtain the speed of the vehicle, the acceleration of the vehicle, and the yaw rate of the vehicle, and the steering wheel angle of the vehicle, as the sensing information.

The detecting of a roll angle may detect a torsion angle generated when the vehicle turns, from as the roll angle.

According to exemplary embodiments of the present invention, the present invention can achieve the following effects by stably controlling the position of a vehicle, using a backlash reduction mechanism that reduces backlash of a reduction gear in a vehicle capable of actively controlling roll. First, it is possible to improve the commercial value of a vehicle by removing the gap between left and right stabilizer bars which is caused by backlash of a reduction gear. Second, it is possible to remove a joint due to a gap.

The present invention can achieve the following effects by stably controlling the position of a vehicle, using an actuator equipped with a torsion damper in a vehicle capable of actively controlling roll. First, it is possible to stably control the position of a vehicle, using an actuator equipped with a torsion damper in a vehicle capable of actively controlling roll. Second, when impact shock is applied to the actuator, it may be disadvantageous for the durability of a product and riding comfort. The present invention can minimize impact by achieving damping by stages through three steps and can be precisely optimized by many tuning factors. Third, it is possible to improve riding comfort by preventing a vehicle from inclining.

The present invention can achieve the following effects by compensating for left-right inclination, using stabilizer bars, by generating a torsional force with an actuator having a coaxially-aligning part in a vehicle capable of actively controlling roll. First, it is possible to achieve the effect of actively preventing rolling by minimizing rolling in which a car body is inclined to the left and right, by adjusting a torsion angle of stabilizer bars. Second, it is possible to improve stability that passengers feel, by preventing rolling. Third, it is possible to improve riding comfort by removing inconvenience of passengers due to inclination of a vehicle that is cornering.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 23A to 24B are reference views illustrating the principle of a coaxial arranging unit in the actuator according to the third exemplary embodiment of the present invention.

Figure 1:
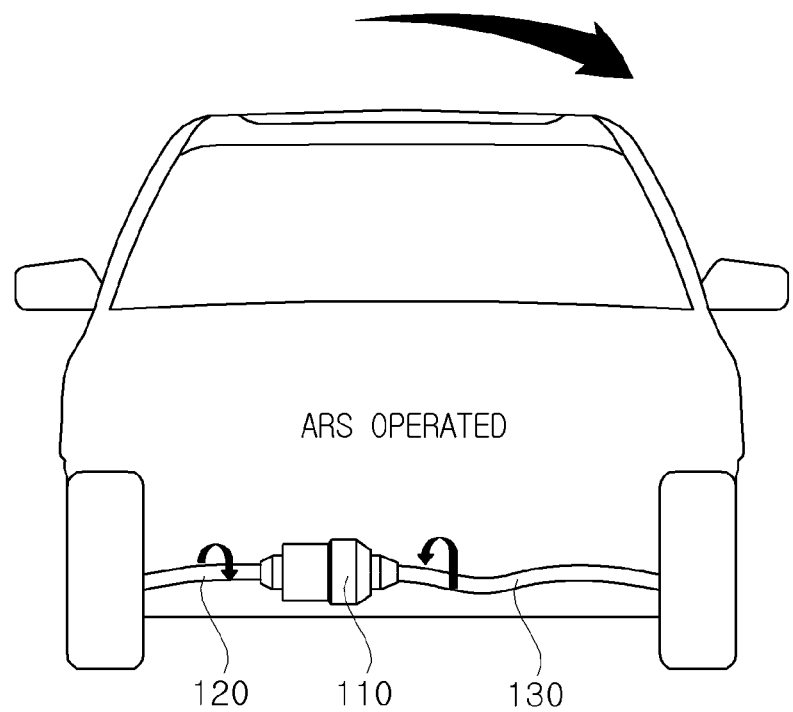
FIG. 1 is a schematic view illustrating the lower portion of a vehicle equipped with an ARS (Active Roll Stabilizer) system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

First, in the specification, in adding reference numerals to components throughout the drawings, it should be noted that like reference numerals designate like components even though the components are illustrated in different drawings. In describing the present invention, well-known functions or constructions will not be described in detail since they may unnecessarily obscure the understanding of the present invention. Exemplary embodiments of the present invention will be described hereafter, but the spirit of the present invention is not limited thereto and may be modified and implemented in various ways by those skilled in the art.

Figure 2A:
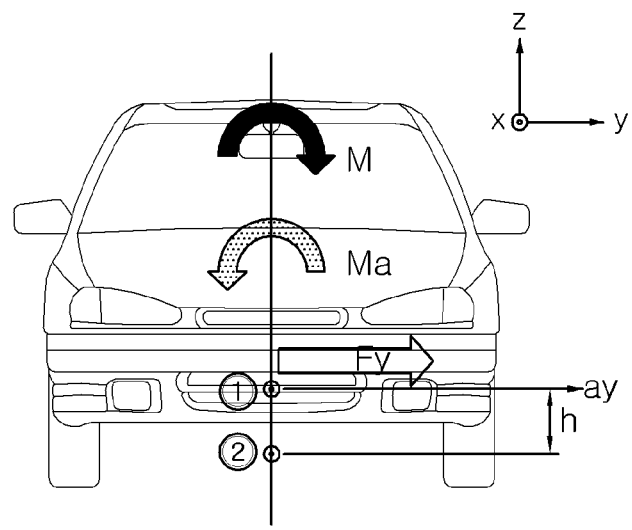
FIGS. 2A and 2B are views comparing a vehicle equipped with an ARS system and a vehicle without an ARS system.
Figure 2B:
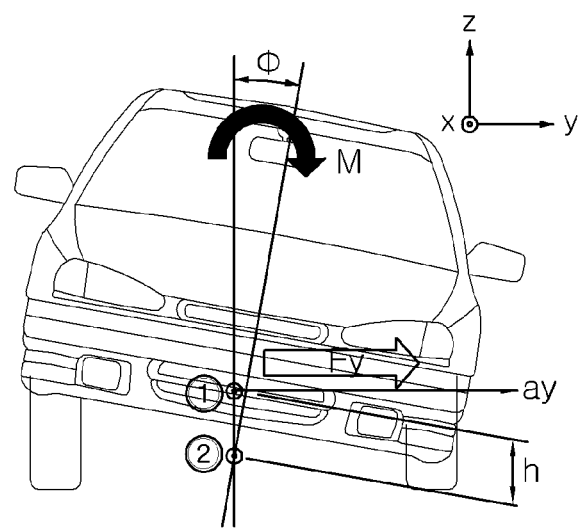

FIG. 1 is a schematic view illustrating the lower portion of a vehicle equipped with an ARS (Active Roll Stabilizer)

system. FIGS. 2A to 2B are views comparing a vehicle equipped with an ARS system and a vehicle without an ARS system.

ARS systems are devices that increase safety and riding comfort of a vehicle by changing stiffness of a stabilizer bar. ARS systems, as illustrated in FIG. 2A, increase stability by suppressing roll of a vehicle when the vehicle turns, or controls the transverse position of a vehicle by distributing roll stiffness of front/rear wheels. FIG. 2B is an example of a vehicle without an ARS system.

ARS systems improve riding comfort too by reducing a shock from the road surface, by decreasing the stiffness of a stabilizer bar while a vehicle travels straight.

As in FIG. 2A, a vehicle equipped with an ARS system includes an actuator 110 and two stabilizer bars 120 and 130. The actuator 110 may be an electric rotary actuator. Any one of the two stabilizer bars 120 and 130 may be a fixed type stabilizer bar and the other one may be a rotary type stabilizer bar. Both of the stabilizer bars 120 and 130 may be rotary type stabilizer bars.

Figure 3:
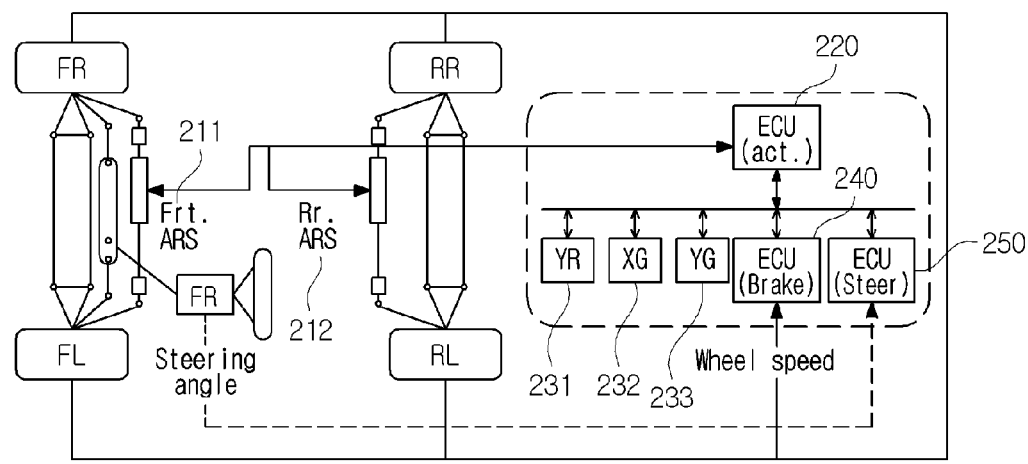
FIG. 3 is a first exemplary view of an ARS system that is mounted on a vehicle.

A vehicle using the present invention is a vehicle equipped with an ARS system and the position of the vehicle is controlled by the ARS system. FIG. 3 is a first exemplary view of an ARS system that is mounted on a vehicle.

A front ARS 211 is a rotary actuator adjusting a torsional force of a stabilizer bar connecting two front wheels FR and FL. A rear ARS 212 is a rotary actuator adjusting a torsional force of a stabilizer bar connecting two rear wheels RR and RL.

An actuator ECU 220 is an ECU driving the actuator for the front ARS 211 and the actuator for the rear ARS 212.

A brake ECU 240 is an ECU for actions associated with a brake such as an ABS (Anti-lock Brake system) and ESC (Electronic Stability Control). A wheel speed sensor is a sensor that determines the state of a vehicle such as a speed, forward movement, backward movement, turning, and stopping. Values measured by the wheel speed sensor are inputted to the brake ECU 240.

A steering wheel ECU 250 is an ECU that determines the steering state of a vehicle. A steering angle sensor is a sensor required for determining the state of a vehicle according to a steering angle such as the position of a steering wheel wound to the left and right of the front wheels. Values measured by the steering angle sensor are inputted to the steering wheel ECU 250.

A YR (Yaw Rate sensor) 231 is a sensor for determining operation of the vertical axis of a vehicle. The YR 231 senses rotation about z axis.

An XG (X axis G sensor) 232 is an acceleration sensor for determining forward and backward acceleration of a vehicle.

An YG (Y axis G sensor) 233 is an acceleration sensor for determining width-directional acceleration of a vehicle.

Figure 4:
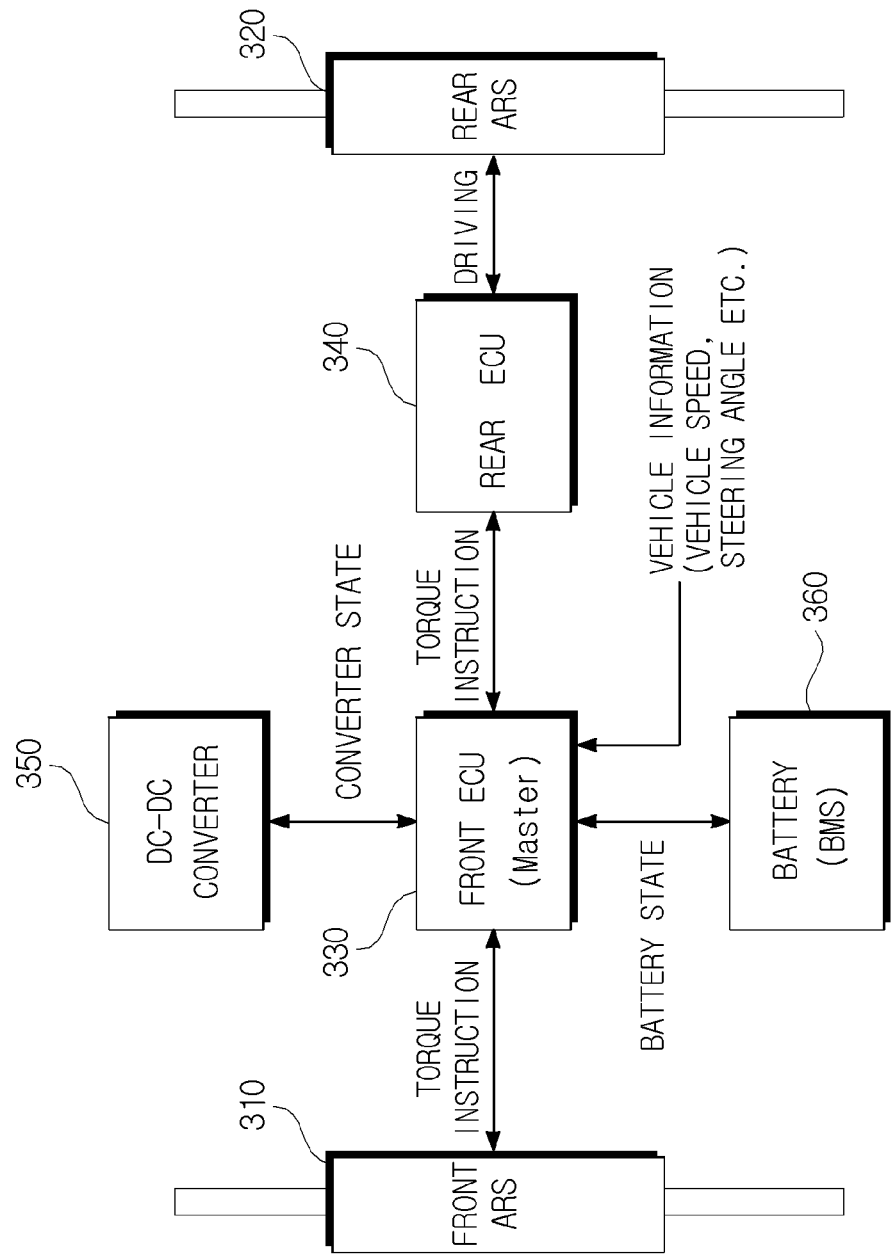
FIGS. 4 and 5 are secondary exemplary views of an ARS system that is mounted on a vehicle.
Figure 5:
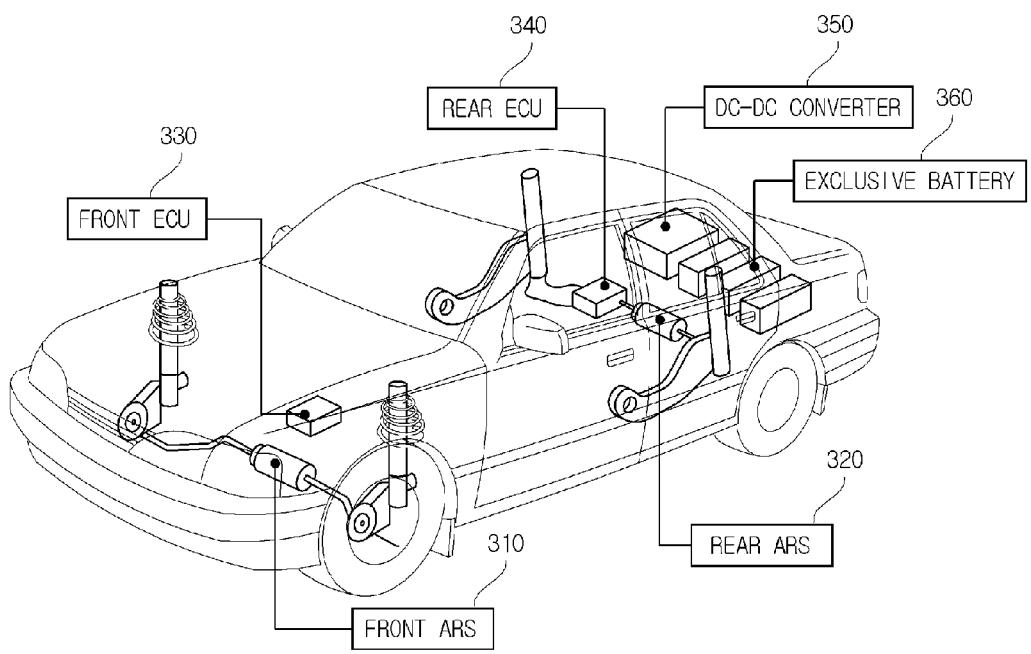

FIGS. 4 and 5 are secondary exemplary views of an ARS system that is mounted on a vehicle.

In the ARS system illustrated in FIG. 3, that is, the ARS system according to the first exemplary embodiment, one ECU controls both of the front ARS and the rear ARS. In contrast, in the ARS system illustrated in FIGS. 4 and 5, that is, the ARS system according to the second exemplary embodiment, two ECUs 330 and 340 control a front ARS 310 and a rear ARS 320, respectively.

The front ECU 330 is a master ECU, controls the whole system, including a DC-DC converter 350 and a BMS (Battery Management System) 360, and distributes the optimum torque value to the front ARS 310 and the rear ARS 320 in accordance with the traveling situation.

The summary of control logic is as follows. The master ECU finds the optimum roll angle from a steering angle, a vehicle speed, and a transverse acceleration, and calculates a torque value for obtaining the roll angle and transmits it to a motor controller. The motor controller generates torque by controlling a current and controls the position of a vehicle by changing the angle of the stabilizer bars with the torque.

Figure 6:
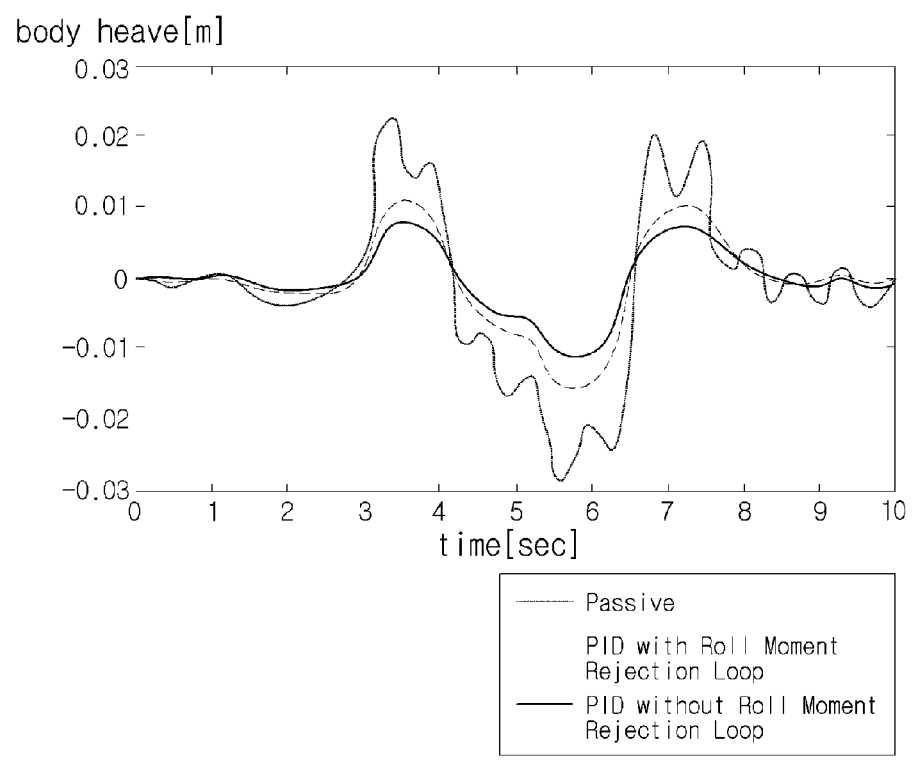
FIG. 6 is a graph illustrating changes in roll angle due to turning of a vehicle.

FIG. 6 is a graph illustrating changes in roll angle due to turning of a vehicle. FIG. 6 illustrates a test result of an ARS and a common stabilizer, from which it can be seen that the ARS ensures a lower roll angle in comparison to the stabilizer, so it can improve stability in turning of a vehicle.

Figure 7:
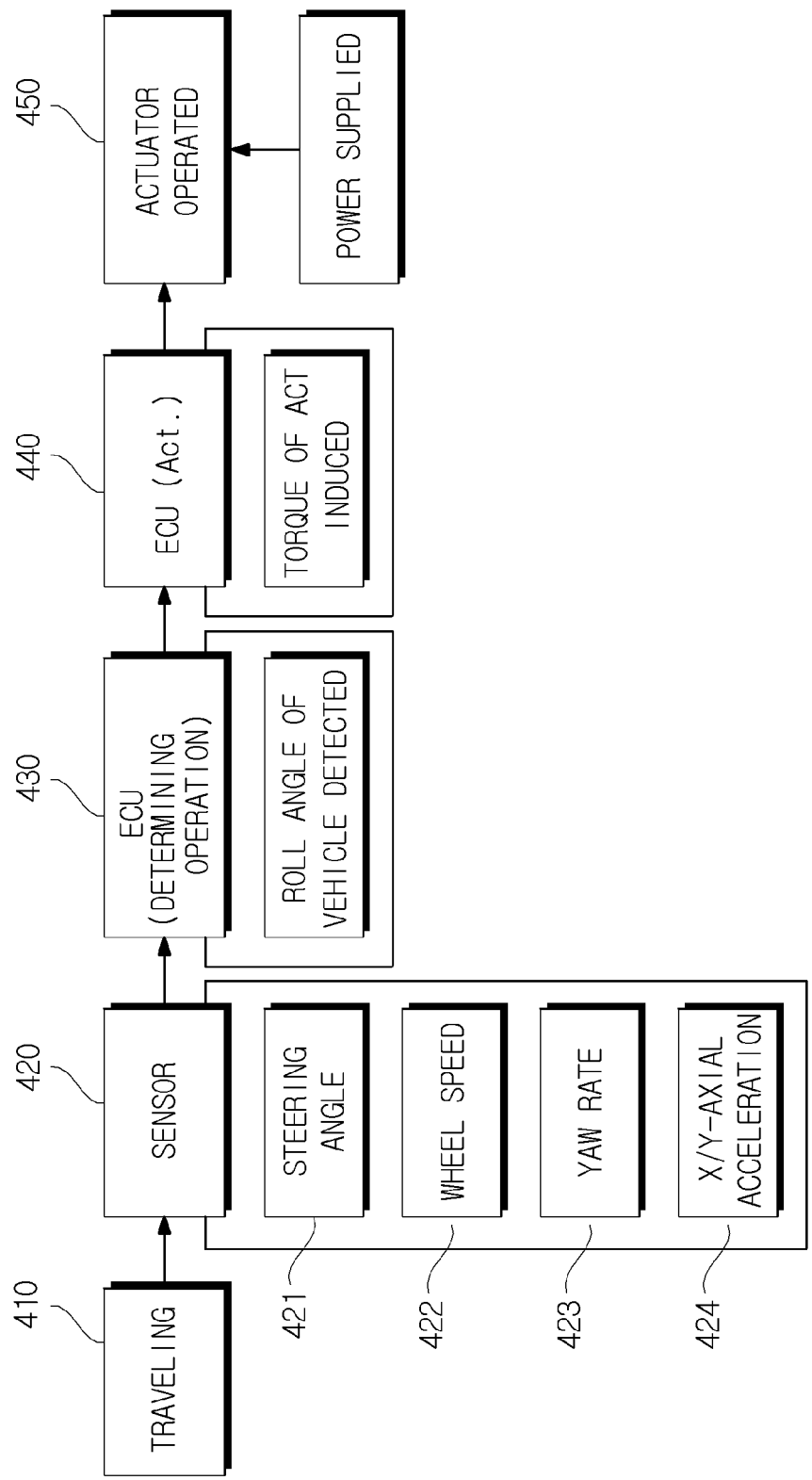
FIG. 7 is a function diagram of an ARS system mounted on a vehicle.

FIG. 7 is a function diagram of an ARS system mounted on a vehicle.

The ARS system includes a first stabilizer bar, a second stabilizer bar, an actuator, a first electronic control unit, and a second electronic control unit.

The first stabilizer bar is a stabilizer bar connected to the wheels at one side of a vehicle. The second stabilizer bar is a stabilizer bar connected to the wheels at the other side of the vehicle. Any one of the first stabilizer bar and the second stabilizer bar may be a fixed type stabilizer bar and the other one may be a rotary type stabilizer bar. Both of the first stabilizer bar and the second stabilizer bar may be rotary type stabilizer bars.

The actuator 450 connects the first stabilizer bar and the second stabilizer bar and controls the position of a vehicle The first electronic control unit 430 detects the roll angle of a vehicle on the basis of the items of information 421~424 from sensors on the vehicle in traveling 410. The first electronic control unit 430 uses the wheel speed 422 of a vehicle sensed by a wheel speed sensor, acceleration 424 of the vehicle including X-axial acceleration and Y-axial acceleration, the yaw rate 423 of the vehicle, and the steering wheel angle 421 of the vehicle sensed by a steering angle sensor 421, as the sensing information in order to detect the roll angle. The first electronic control unit 430 detects a torsion angle generated when a vehicle turns, as the roll angle. The first electronic control unit 430 may be, for example, the brake ECU 240 or the steering wheel ECU 250 illustrated in FIG. 3.

The second electronic control unit 440 calculates torque for compensating for the roll angle of the vehicle on the basis of the torque generated by the first electronic control unit 430 and controls the actuator 450 on the basis of the torque. The second electronic control unit 440 may be the actuator ECU 220 illustrated in FIG. 3.

In general, a typical stabilizer bar is mounted to reduce inclination due to a centrifugal force when a vehicle turns left or right.

In the present invention, the typical stabilizer is cut and divided at the center, rotary actuators, including the front ARS 211 and the rear ARS 212, are formed at the cut position, and a torsional force is generated by rotating the rotary actuators against left or right inclination of a vehicle due to a centrifugal force in turning, such that the position of the vehicle is actively made similar to the state in normal straight traveling by both stabilizer bars.

When a vehicle starts (410), the information on the traveling of the vehicle (wheel speed 422, left-right inclination (yaw rate) 423, acceleration 424, angle of steering wheel 421 etc.) is obtained and collected to each ECU 430, such that an instruction for operation is transmitted to the rotary actuator through the ECU 440 for operating the rotary actuator.

The stabilizer bars connected to both ends of the actuator are connected to left and right suspensions by stabilizer bar links. In this structure, when torque fitting to the situation is obtained by analyzing the data collected in the sensors 421 to 424, the torque is outputted through the rotary actuator and operates the active stabilizer, such that roll moment of the vehicle is reduced and riding comfort is improved.

Figure 8A:
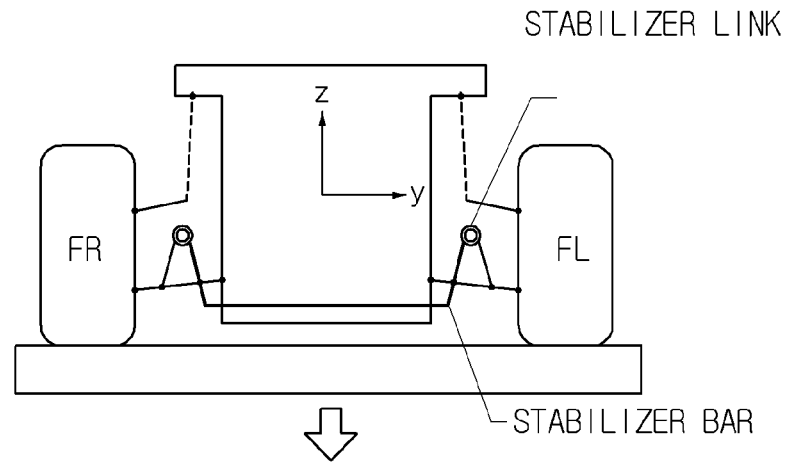
FIGS. 8A to 8C are reference views illustrating driving of a vehicle not using the present invention.
Figure 8B:
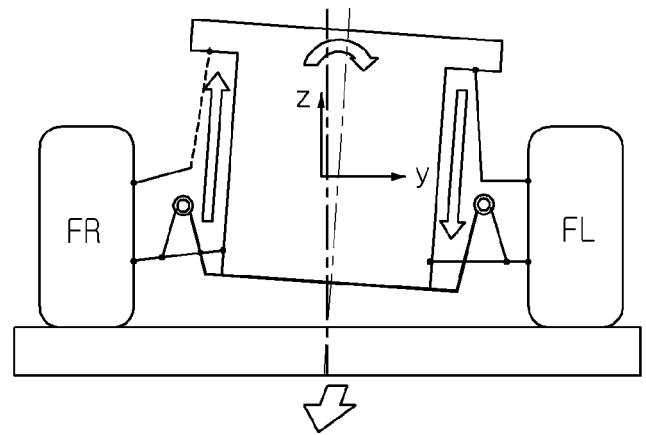
Figure 8C:
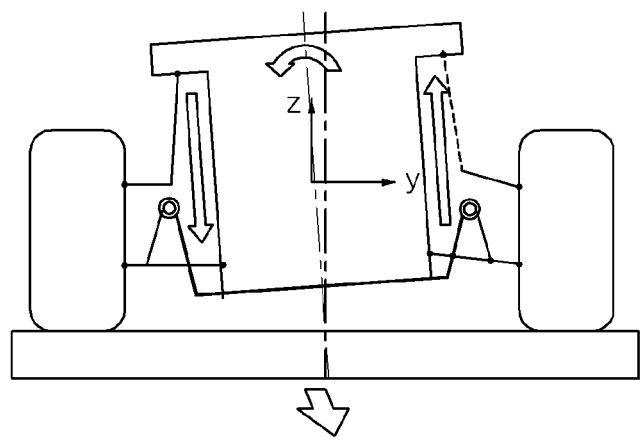

FIGS. 8A to 8C are reference views illustrating driving of a vehicle not using the present invention. FIG. 8A illustrates a vehicle that is in stop, FIG. 8B illustrates a vehicle cornering to the right, and FIG. 8C illustrates a vehicle cornering to the left.

As illustrated in FIG. 8B, when seeing the vehicle cornering to the right from the front, the car body parts connected to the right wheels lifted from the original positions by a centrifugal force generated when the vehicle turns, whereas the car body parts connected to the left wheels lower from the original positions, such that the right side are lifted and the left side are lowered in the vehicle, and thus the passengers in the vehicle are inclined to the left.

Those in FIG. 8C act in the opposite directions to those in FIG. 8B.

Figure 9A:
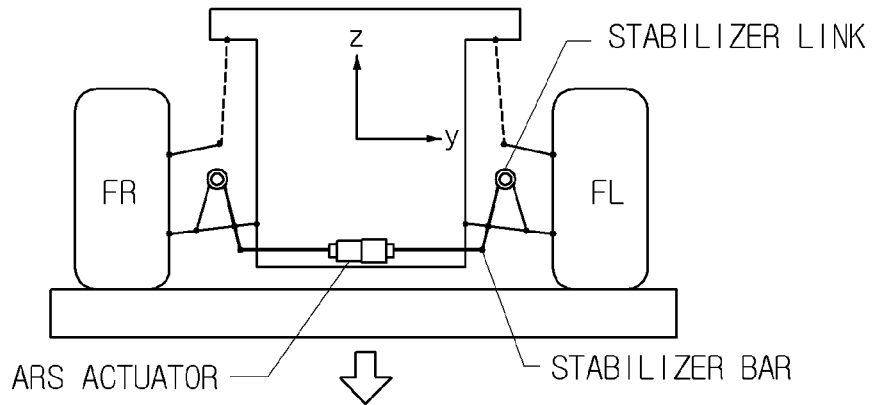
FIGS. 9A to 9C are reference views illustrating driving of a vehicle using the present invention.
Figure 9B:
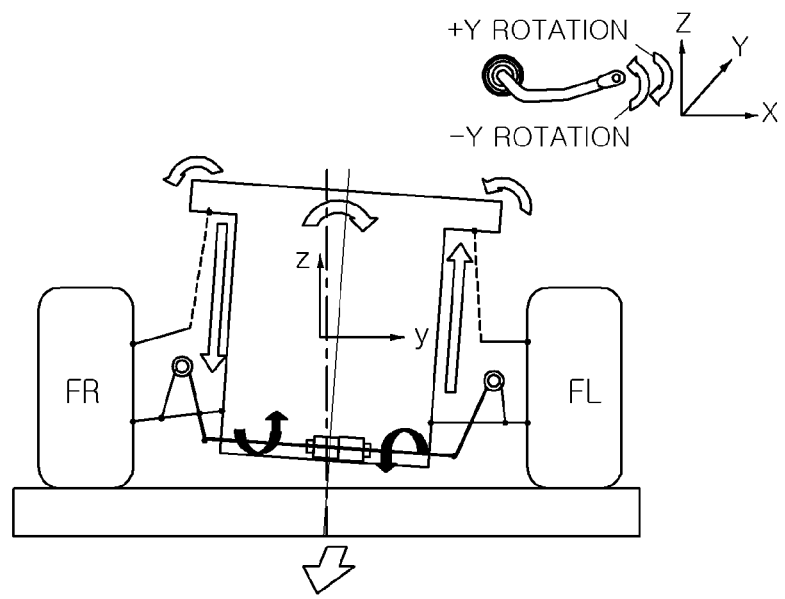
Figure 9C:
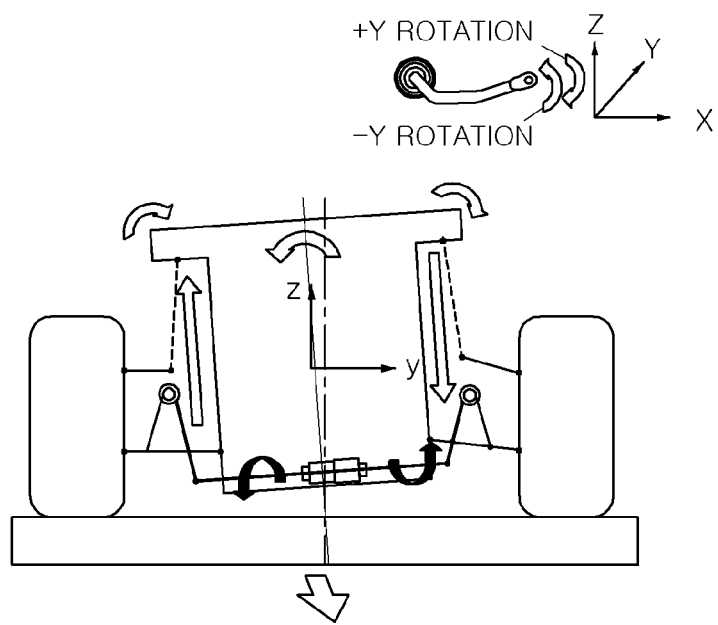

FIGS. 9A to 9C are reference views illustrating driving of a vehicle using the present invention. FIG. 9A illustrates a vehicle that is in stop, FIG. 9B illustrates a vehicle cornering to the right, and FIG. 9C illustrates a vehicle cornering to the left.

An example using the present invention, instead of the stabilizer bars of common vehicles, is illustrated in FIGS. 9A to 9C. In the present invention, the actuator at the middle of a stabilizer bar is designed to be rotatable to make a desired difference in angle from a fixed stabilizer by twisting a rotary stabilizer, depending on situations.

If it is a common vehicle, it is inclined to a side, as illustrated in FIG. 8B, when turning to the right, but when the present invention is used, the stabilizer bar at the right side of the vehicle, which has been lifted as illustrated in FIG. 9B, is rotated to the roof of the vehicle to pull the lower arm at the right side of the vehicle, such that the right side of the vehicle is prevented from being lifted, while the stabilizer bar at the left side of the vehicle which has been lowered is lifted in the opposite direction by relative rotation of the actuator, such that the left side of the vehicle is prevented from lowering; therefore, it is possible to prevent the vehicle from being inclined.

On the contrary, in the opposite case to that described above, as illustrated in FIG. 9C, when the vehicle turns left, the stabilizer bar at the left side of the vehicle which has been lifted is twisted to pull the lower arm at the left side and lower the vehicle, such that the vehicle is prevented from being lifted, whereas the stabilizer bar at the right side of the vehicle is twisted to the bottom of the vehicle by a relative motion to push the lower arm and lift the lowered portion, such that the right side of the vehicle is prevented from lowering; therefore the vehicle is prevented from inclining to the right.

Those operations of the present invention can improve stability and riding comfort that passengers feel, when a vehicle turns.

Figure 10:
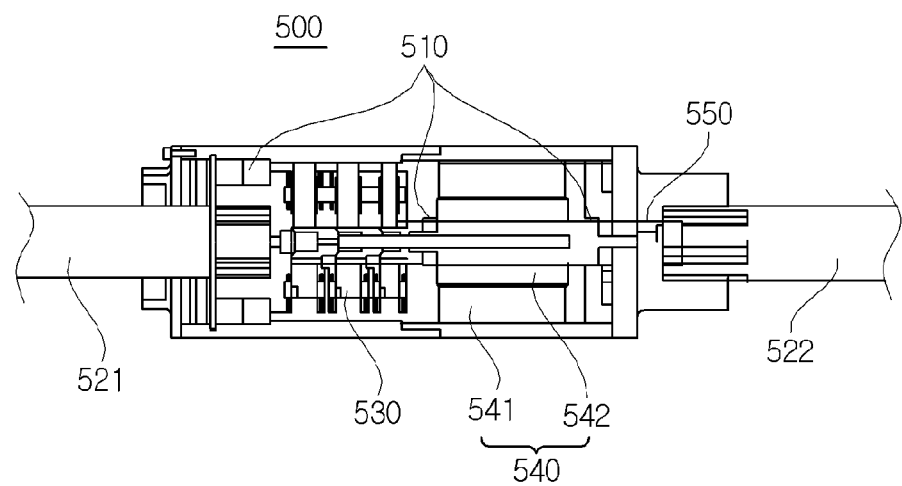
FIG. 10 is a cross-sectional view illustrating the internal configuration of an actuator according to a first exemplary embodiment of the present invention.

FIG. 10 is a cross-sectional view illustrating the internal configuration of an actuator according to a first exemplary embodiment of the present invention.

In an active roll control apparatus, it is possible to improve stability and riding comport while a vehicle travels by changing the stiffness of stabilizer bars. An electric type includes a motor and a reduction gear and is simple in structure and advantageous in terms of the cost in comparison to hydraulic types. However, spacing of stabilizer bars due to backlash of the reduction gear may cause jointing.

The present invention proposes a structure that can reduce backlash of a reduction gear, using a spring force. It is possible to generate a normal force by applying the spring force to the final sun gear. Then, a rotational force is generated by a helix angle between the sun gear and the planetary gear due to the normal force, and accordingly, the effects of reducing the backlash and the gap between the stabilizers can be achieved.

The spring force is applied not to the entire multi-step planetary gear, but only to the final gear. Accordingly, the backlash can be reduced without a large drop in efficiency.

Hereinafter, this is described with reference to FIG. 10.

An actuator 500 according to the first exemplary embodiment includes a fixed stabilizer bar 522, a rotary stabilizer bar 521, a multi-step planetary gear set 530, a motor 540, and a backlash reduction mechanism 550.

Strictly speaking, the fixed stabilizer bar 522 and the rotary stabilizer bar 521 are not included in the configuration of the actuator, but the fixed stabilizer bar 522 and the rotary stabilizer bar 521 are included in the actuator for the convenience in the present exemplary embodiment.

The fixed stabilizer bar 522 is a bar fixed to a side of a housing.

The rotary stabilizer bar 521 is rotatably mounted on the other side of the housing.

The rotary stabilizer bar 521 is a part connected to the final output part of the multi-step planetary gear set 530 and receiving a rotational force through the motor 540 and a reduction gear. The rotary stabilizer bar 521 is fitted on the shaft inside of the fixed stabilizer bar 522 by bearings 510.

The bearings 510 increase lifespan and reduce noise and vibration by reducing resistance between rotary parts.

The multi-step planetary gear set 530 includes a sun gear, a planetary gear, and a carrier and is disposed in the housing. The multi-step planetary gear set 530 is connected to the rotary stabilizer bar 521 in the housing. The multi-step planetary gear set 530 includes a reduction gear having a gear ratio increasing with an increase in number of gears.

The motor 540 includes a stator 541 generating a magnetic force, when power is applied, and a rotor 542 rotated by the magnetic force generated by the stator 541, and is disposed in the housing. The motor 540 is positioned between the fixed stabilizer bar 522 and the planetary gear set 530 in the housing.

The backlash reduction mechanism 550 controls backlash of the reduction gear for reducing the gap between the fixed stabilizer bar 522 and the rotary stabilizer bar 521 by applying a load to the sun gear.

The actuator may further include an encoder and a position sensor.

The encoder controls driving of the motor 540 and is positioned between the motor 540 and the fixed stabilizer bar 522 in the housing.

The position sensor, a sensor measuring a position, is mounted on the rotary stabilizer bar 521.

Figure 11:
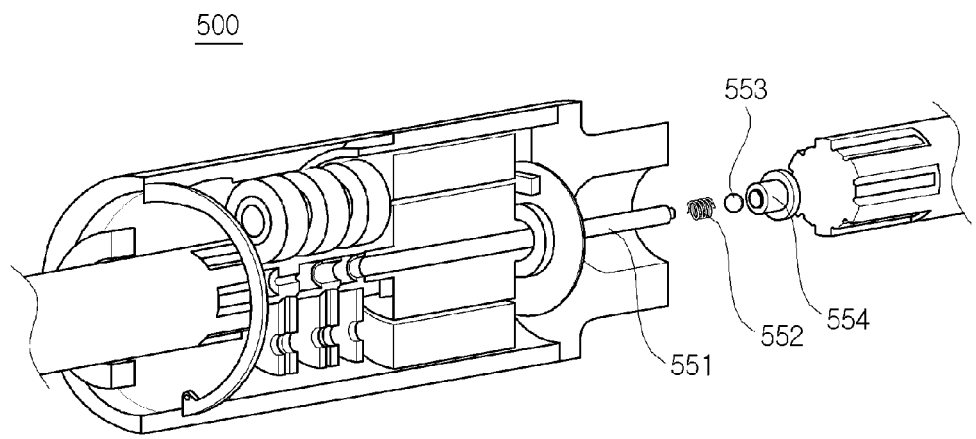
FIG. 11 is an exploded perspective view of a backlash reduction mechanism in the actuator according to the first exemplary embodiment.

FIG. 11 is an exploded perspective view of a backlash reduction mechanism in the actuator according to the first exemplary embodiment.

The backlash reduction mechanism 550 reduces the gap of the ARS actuator by controlling backlash of the reduction gear in the multi-step planetary gear set 530. The backlash reduction mechanism 550 includes a push rod 551, a spring 552, a ball 553, and a lock nut 554 in the present exemplary embodiment.

The push rod 551 is in close contact with one end of the sun gear through the motor 540. The push rod 551 applies a load to the sun gear, using the force of the spring 552.

The spring 552 applies the load by an elastic force to the lock nut 554 and the push rod 551, with one end in contact with the lock nut 554 and the other end in contact with the push rod 551. The spring 552 applies a predetermined load to the sun gear, using a compression force.

The ball 553 is inserted between the lock nut 554 and the spring 552 and supports rotation of the push rod 551. That is, the ball 553 makes the push rod 551 rotate well between the spring 552 and the lock nut 554.

The lock nut 554 is fitted on one end of the fixed stabilizer bar 522. The lock unit 554 transmits a predetermined load to the third sun gear through the spring 552 and prevents separation of a gap reduction mechanism.

FIGS. 12 to 14B are reference views illustrating the principle of reducing gear backlash in the first exemplary embodiment.

The operation principle of the ARS actuator is described first hereafter.

The torque generated by the motor is transmitted by engagement between the rotor with both ends supported by the bearings and the sun gear of the first planetary gear. The rotational force of the sun gear is outputted to the first carrier in accordance with the common principle of a planetary gear and the first carrier is in mesh with the second sun gear. The rotational force increased by reduction is outputted to the third carrier supported by a bearing in accordance with the principle described above, such that the left second stabilizer bar connected to the third carrier and the right first stabilizer bar connected to the housing of the ARS actuator relatively rotate.

The principle of reducing gear backlash with this configuration is described hereafter.

Figure 12:
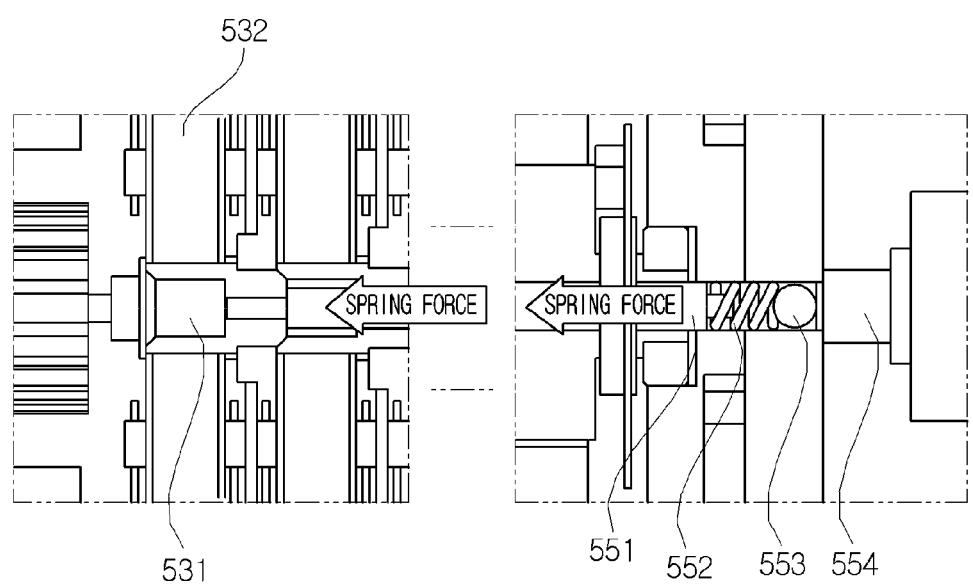
FIGS. 12 to 14B are reference views illustrating the principle of reducing gear backlash in the first exemplary embodiment.

As in the right of FIG. 12, the spring 552 generates a load toward the third sun gear 531, between the ball 553 supported by the lock nut 554 and the push rod 551.

Thereafter, as illustrated in the left of FIG. 12, the third sun gear 531 receiving the load from the push rod 551 moves axially in parallel with the third planetary gear 532.

Figure 13:
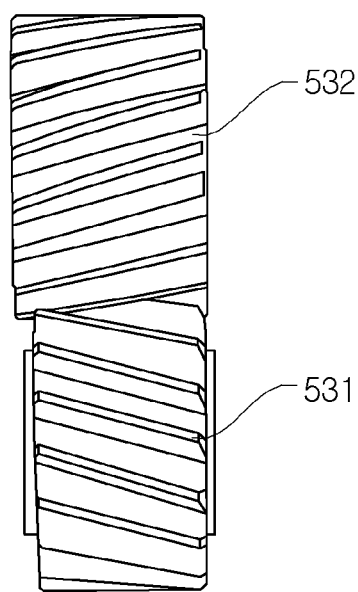
Figure 14A:
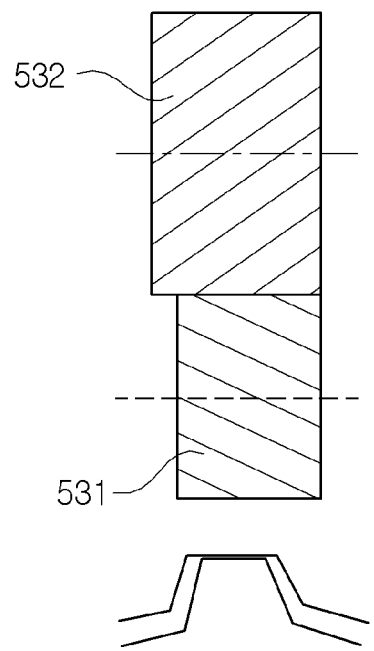
Figure 14B:
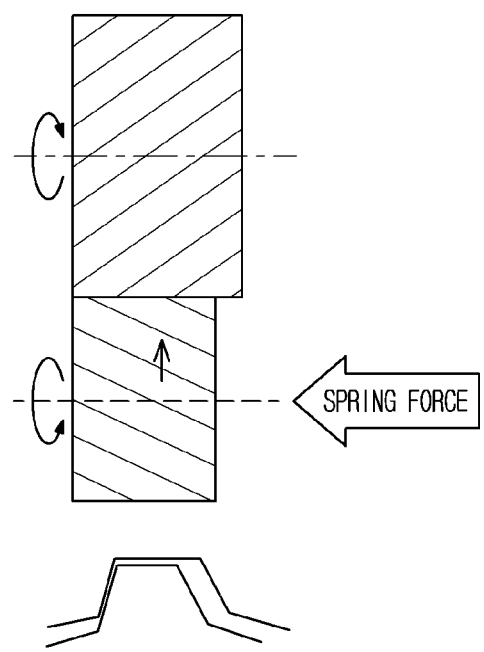

Since a helix angle is set on the third sun gear 531 and the third planetary gear 532, as illustrated in FIG. 13, the gears 531 and 532 axially move relatively to each other in mesh with each other, a rotational force is generated, as illustrated in FIG. 14B.

According to the present invention, gear backlash is removed by the axial rotation and a rotational force keeps applied by the spring force, such that a gap is not generated between the rotary stabilizer bar and the fixed stabilizer bar at both sides.

On the other hand, a rotational force is not generated, as illustrated in FIG. 14A, in an actuator without the backlash reduction mechanism 55 of the present invention.

The features of the present invention described above are summarized as follows.

First, although it is possible to reduce backlash by generating a normal force to the right, using the spring mounted at the third sun gear side, a friction force is generated on the second sun gear and the first sun gear too in this case, so the entire efficiency of the reduction gear is considerably decreased. The present invention is characterized in that the push rod 551 disposed through the hollow type motor applies a normal force only to the third sun gear, such that a friction force is exerted only on the ball 553 and the lock nut 554 through the push rod 551 connected with the third sun gear. Accordingly, the backlash can be reduced without a large drop in efficiency.

Figure 15:
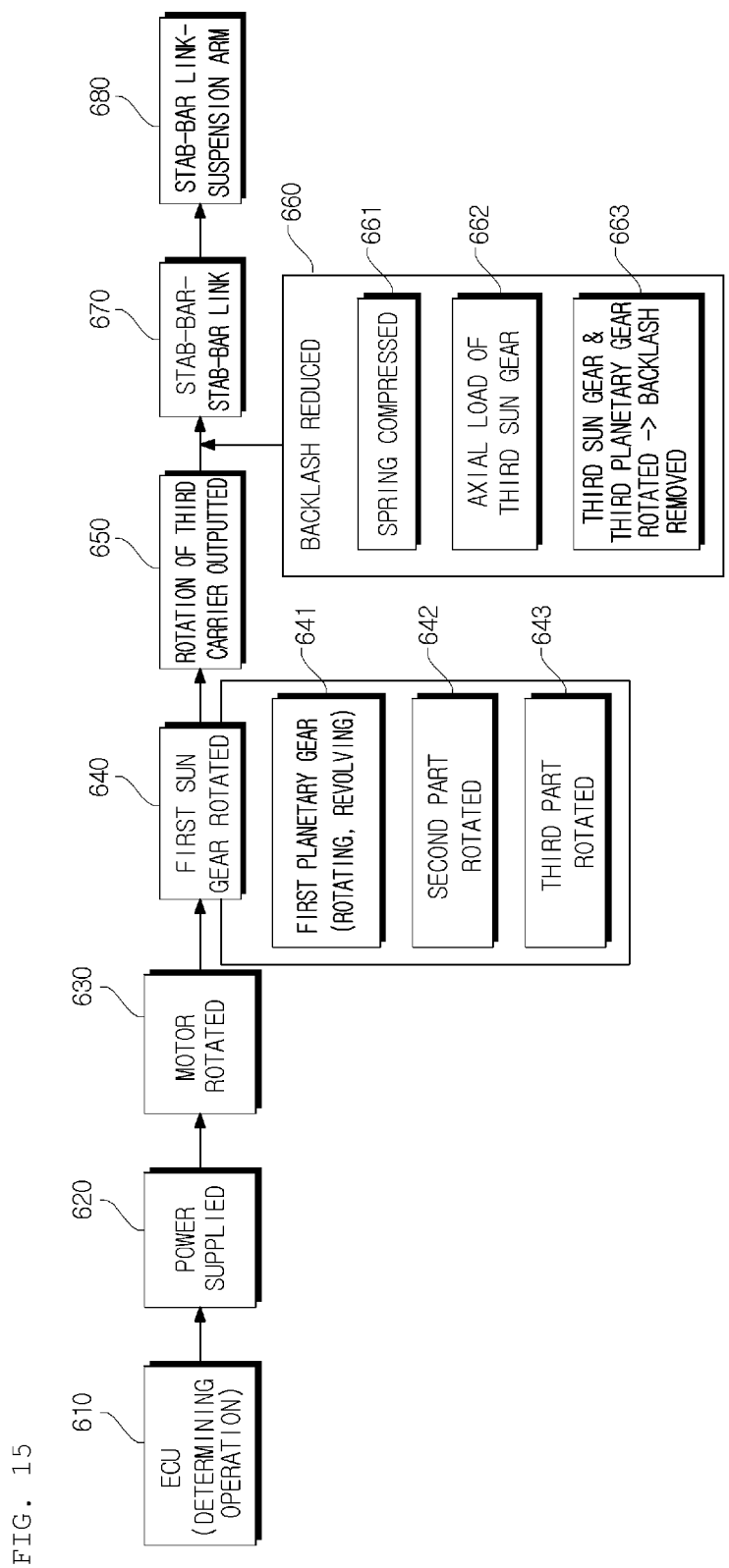
FIG. 15 is a flowchart illustrating a method of controlling the position of a vehicle, using the actuator according to the first exemplary embodiment.

FIG. 15 is a flowchart illustrating a method of controlling the position of a vehicle, using the actuator according to the first exemplary embodiment.

As illustrated in FIG. 10, the actuator 500 according to the first exemplary embodiment of the present invention, which is an actuator that operates an active stabilizer, is assembled in the order of the rotary stabilizer 521, the multi-step planetary gear set 530, the motor 540, and the fixed stabilizer bar 522.

In order to increase the coaxial degree between the rotary stabilizer bar 521 and the fixed stabilizer bar 522, the rotary stabilizer bar 521 is fitted on the fixed stabilizer bar 552 disposed at the opposite side through the actuator by the bearings.

The rotary stabilizer bar 521 disposed through the actuator increases the coaxial degree between the sun gear of the multi-step planetary gear set 530 and the motor 540.

An encoder for driving the motor 540 is disposed between the motor 540 and the fixed stabilizer bar 522 fixed to the housing and a position sensor is disposed between the output-side rotary stabilizer bar 521 connected with the reduction gear and the housing, such that it is possible to know the position state of the rotary stabilizer bar 521 and the fixed stabilizer bar 522 and to check the left-right inclination state of the vehicle only with the ARS actuator.

When the sensing information obtained by the sensors is collected to the ECU (610), power is supplied (620) and the motor is rotated (630). Thereafter, the multi-step planetary gear 530 is driven. The sun gear is primarily rotates first (640), the planetary gear is primarily rotated in consideration of rotation and revolution, and then the carrier is primarily rotated (641). Thereafter, the parts keep make second and third rotation (642, 643). When the third rotation of the carrier is outputted, it is transmitted to the stabilizer bars (650) and backlash is removed or reduced (660) by compression of the spring (661), an axial load generated to the third sun gear (662), a rotational force generated between the third sun gear and the third planetary gear (663). Thereafter, the rotation is transmitted to a suspension arm (680) through a stabilizer bar link (670). As described above, in the present exemplary embodiment, when a vehicle is inclined left or right, the stabilizer bars are twisted and the torsional force is transmitted to the suspensions through links.

Figure 16:
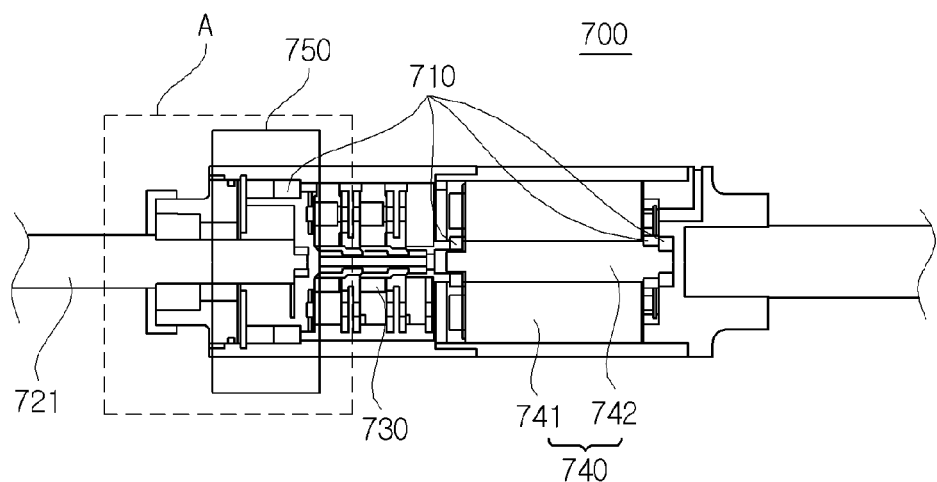
FIG. 16 is a cross-sectional view illustrating the internal configuration of an actuator according to a second exemplary embodiment of the present invention.

FIG. 16 is a cross-sectional view illustrating the internal configuration of an actuator according to a second exemplary embodiment of the present invention. The present invention proposes a damping structure for improving durability of a product and a riding comfort against an external impact force on a vehicle equipped with an actuator on a stabilizer bar and capable of performing active roll control. Hereinafter, this is described with reference to FIG. 16.

An actuator 700 according to the second exemplary embodiment includes a fixed stabilizer bar 722, a rotary stabilizer bar 721, a multi-step planetary gear set 730, a motor 740, and a torsion damper 750.

In the actuator 700 according to the second exemplary embodiment, the fixed stabilizer bar 722, rotary stabilizer bar 721, multi-step planetary gear set 730, and motor 740 have the same functions as those of the actuator according to the first exemplary embodiment and they are not described in detail.

The torsion damper 750 has a function of damping at the other side of the housing where the rotary stabilizer bar 721 is coupled.

Figure 17:
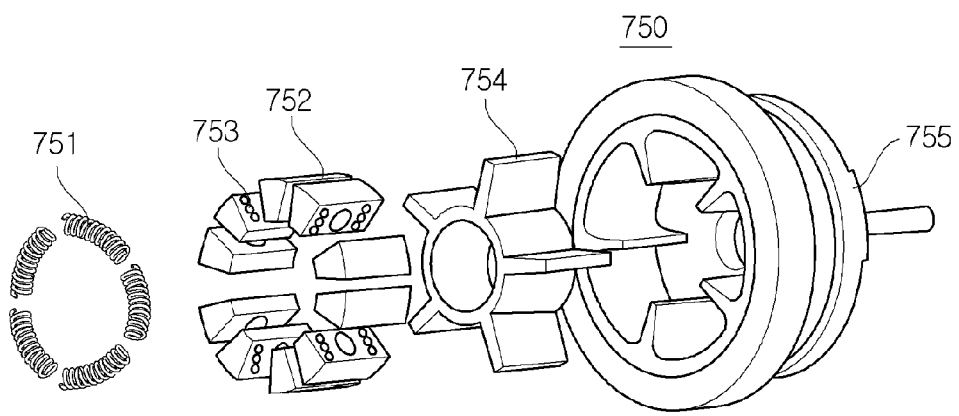
FIG. 17 is an exploded perspective view of a torsion damper in the actuator according to the second exemplary embodiment.

FIG. 17 is an exploded perspective view of a torsion damper in the actuator according to the second exemplary embodiment.

The torsion damper 750 in this exemplary embodiment is provided to reduce impact torque and improve riding comfort. Referring to FIG. 17, the torsion damper 750 includes a spring 751, a rubber damper 752, and a hub 754. The torsion damper 750 is mounted on a carrier 755 of the multi-step planetary gear set 730.

The carrier 755, a wheel-shaped part capable of rotating in one direction, has first protrusions longitudinally extending at predetermined intervals on the inner side. The carrier 755 fixes a planetary gear and is supported by a bearing. The carrier 755 transmits torque to the hub 754.

The hub 754 has a pipe-shaped body and second protrusions on the outer side of the body which are fitted in between the first protrusions. The hub 753 transmits the torque, which is transmitted from the third-stage carrier 755 through the torsion damper 750, to the rotary stabilizer bar 721.

The rubber damper 752 has damping portions inserted in clearances defined by the grooves formed between the first protrusions and the second protrusions.

The rubber damper 752 has at least one protrusion 753 formed on the surface of each of the damping portion being in contact with the first protrusions or the second protrusions.

The spring 751 is fitted in a through-hole of the damping portions.

Figure 18:
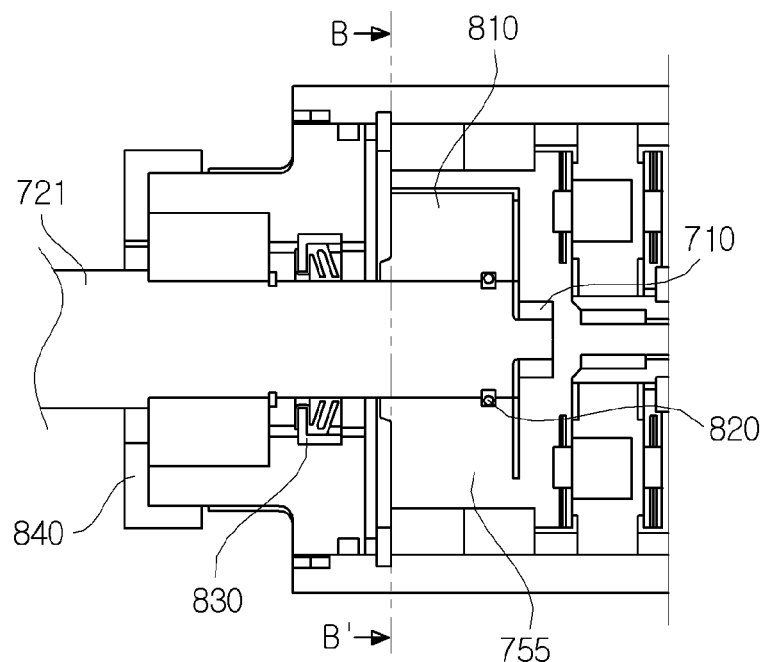
FIG. 18 is an enlarged view of the portion A in FIG. 16.

FIG. 18 is an enlarged view of the portion A in FIG. 16. The hub 810 of FIG. 18 is the same in configuration as the hub 754 of FIG. 17.

Referring to FIG. 18, the actuator may further include a circlip 820, a locking nut 840, and a seal 830.

The circlip 820 fixes the hub 810 on the rotary stabilizer bar 721.

The locking nut 840 closes a gap made by coupling of the housing and the rotary stabilizer bar 721.

The seal closes a gap made by coupling the torsion damper 750 and the rotary stabilizer bar 721. The seat 830 prevents water or foreign substance from flowing into the actuator.

Figure 19:
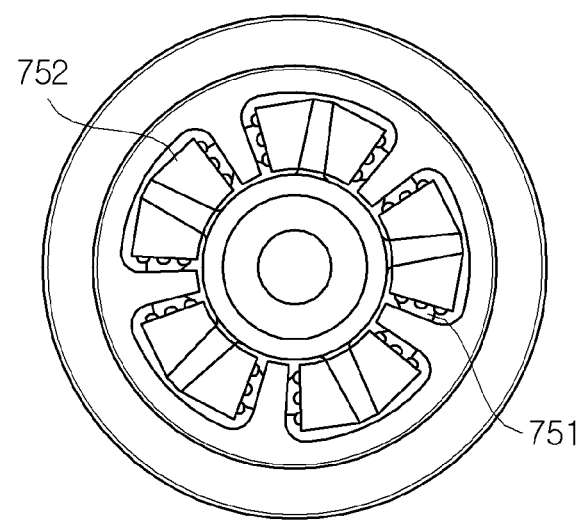
FIG. 19 is a cross-sectional view taken along line B-B in FIG. 18.

FIG. 19 is a cross-sectional view taken along line B-B in FIG. 18.

The torque generated by the motor is transmitted by engagement between the rotor with both ends supported by the bearings and the sun gear of the first planetary gear. The rotational force of the sun gear is outputted to the first carrier in accordance with the common principle of a planetary gear and the first carrier is in mesh with the second sun gear. A rotational force increased by reduction is outputted to the third carrier supported by a bearing in the principle described above and the third carrier has the shape illustrated in FIG. 17.

The rotational force transmitted to the hub in the principle of damping torsion described below is limited axially by the circlip and finally transmitted to the rotary stabilizer bar engaged with the hub. The rotational force of the rotary stabilizer changes the position of the stabilizer link. Accordingly, the roll angle of the car body changes.

Next, the principle of damping torsion is described hereafter.

In a vehicle in stop, a clearance is formed between the rubber damper 752 being in contact with the hub and the carrier, as illustrated in FIG. 19, and an initial mounting force is exerted in the spring 751.

The hub is in mesh with the rotary stabilizer and the rotary stabilizer is fixed to a suspension. That is, when a force is inputted from the outside, the hub rotates and transmits a force back to the carrier and the vehicle in stop needs a large amount of torque to rotate the hub.

When an impact force is generated in the suspension system due to traveling on an abnormal road or excessive behavior of a vehicle, a large rotational force is applied to the two stabilizers through the stabilizer link and transmitted to the hub.

For example, as the hub rotate counterclockwise, the spring force acts as a reacting force in the first step, a reacting force acts due to contact of the embossed portions together with the spring force in the second step, the spring force and compression of the rubber damper are implemented in the third step, and a rotational force is transmitted to the carrier in the fourth step, when the rubber damper is deformed enough against an external force.

This is the same even for sudden generation of torque in the actuator.

Figure 21:
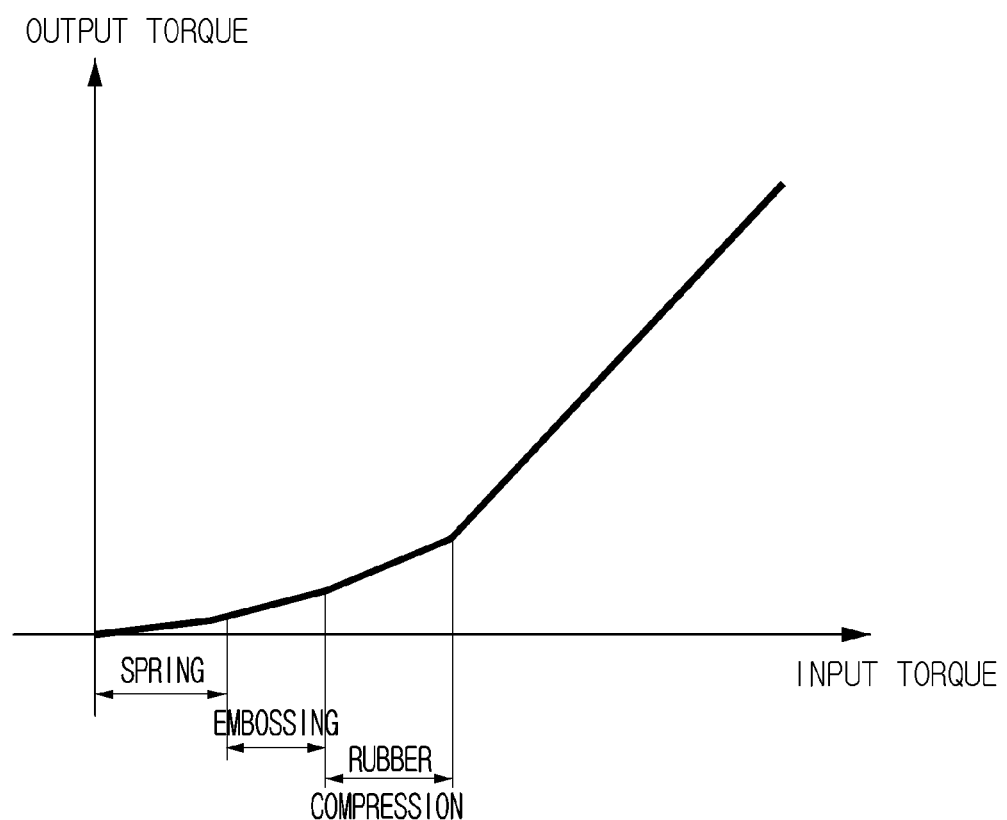
FIG. 21 is a graph comparing input torque with output torque at each step.

FIG. 21 is a graph comparing input torque with output torque at each step. The spring, embossing, and rubber compression mean the first step, second step, and third step, respectively in FIG. 21.

Figure 20:
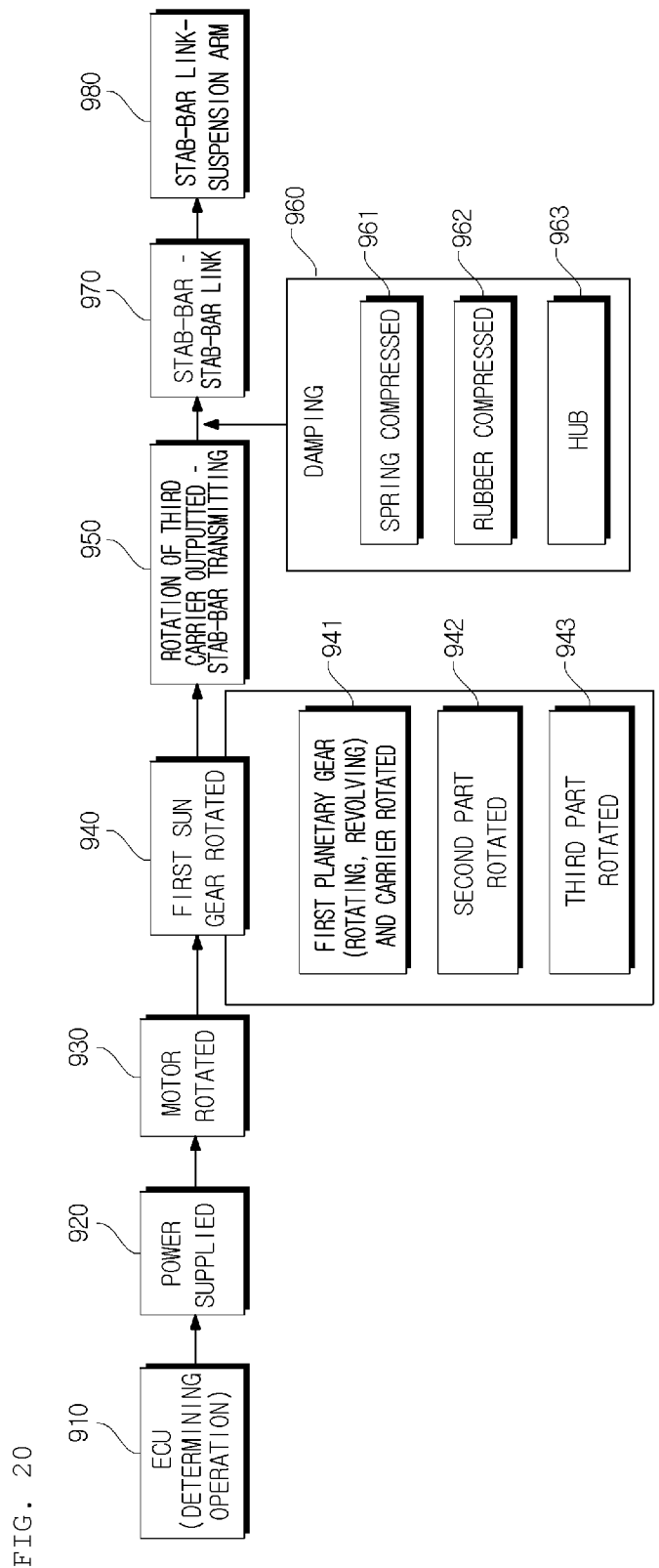
FIG. 20 is a flowchart illustrating a method of controlling the position of a vehicle, using the actuator according to the second exemplary embodiment.

FIG. 20 is a flowchart illustrating a method of controlling the position of a vehicle, using the actuator according to the second exemplary embodiment.

As illustrated in FIG. 16, an actuator according to the present invention, which is an actuator that operates an active stabilizer, is assembled in the order of the rotary stabilizer 721, the multi-step planetary gear set 730, the motor 740, and the fixed stabilizer bar 722.

In order to increase the coaxial degree between the rotary stabilizer bar 721 and the fixed stabilizer bar 722, the rotary stabilizer bar 721 is fitted on the fixed stabilizer bar 722 disposed at the opposite side through the actuator by the bearings.

The rotary stabilizer bar 721 disposed through the actuator increases the coaxial degree between the sun gear of the multi-step planetary gear set 730 and the motor 740.

An encoder for driving the motor 740 is disposed between the motor 740 and the fixed stabilizer bar 722 fixed to the housing and a position sensor is disposed between the output-side rotary stabilizer bar 721 connected with the reduction gear and the housing, such that it is possible to know the position state of the rotary stabilizer bar 721 and the fixed stabilizer bar 722 and to check the left-right inclination state of the vehicle only with the ARS actuator.

When the sensing information obtained by the sensors is collected to the ECU (910), power is supplied (920) and the motor is rotated (930). Thereafter, the multi-step planetary gear 730 is driven. The sun gear is primarily rotates first (940), the planetary gear is primarily rotated in consideration of rotation and revolution, and then the carrier is primarily rotated (941). Thereafter, the parts keep make second and third rotation (942, 943). When the third rotation of the carrier is outputted, it is transmitted to the stabilizer bars (950) and damping that uses the spring compression (961), the rubber compression (962), and the hub (963) is generated (960). Thereafter, the rotation is transmitted to a suspension arm (980) through a stabilizer bar link (970). As described above, in the present exemplary embodiment, when a vehicle is inclined left or right, the stabilizer bars are twisted and the torsional force is transmitted to the suspensions through links.

Figure 22:
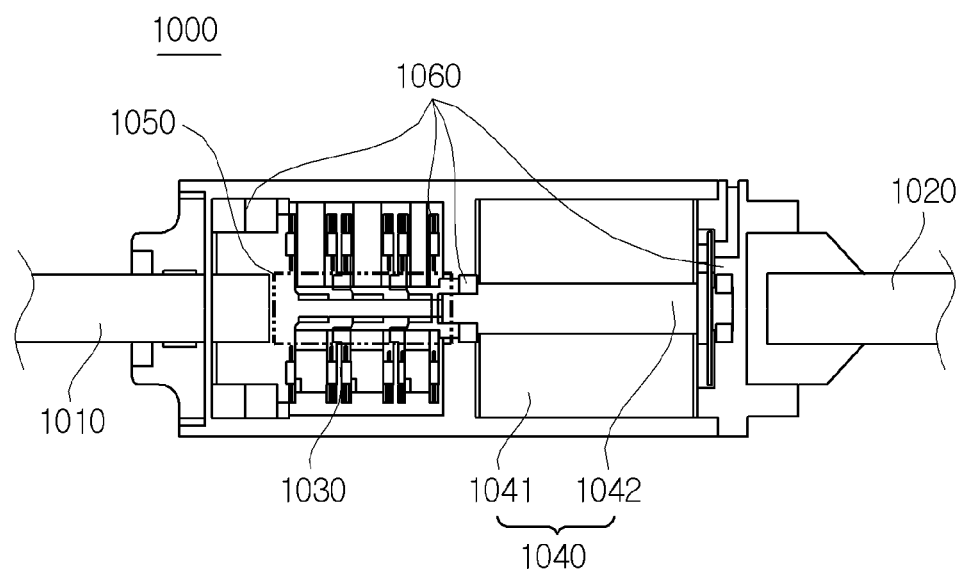
FIG. 22 is a cross-sectional view illustrating the internal configuration of an actuator according to a third exemplary embodiment of the present invention.

FIG. 22 is a cross-sectional view illustrating the internal configuration of an actuator according to a third exemplary embodiment of the present invention.

An actuator 1000 according to the third exemplary embodiment includes a rotary stabilizer bar 1010, a fixed stabilizer bar 1020, a multi-step planetary gear set 1030, a motor 1040, and a coaxially-aligning part 1050.

In the actuator 1000 according to the third exemplary embodiment, the rotary stabilizer bar 1010, fixed stabilizer bar 1020, multi-step planetary gear set 1030, and motor 1040 have the same functions as those of the actuator according to the first exemplary embodiment and they are not described in detail.

The coaxially-aligning part 1050 is machined to reduce the gap between gears by increasing the coaxial degree between the multi-step planetary gear 1030 and the sun gear.

FIGS. 23A to 24B are reference views illustrating the principle of a coaxial arranging unit in the actuator according to the third exemplary embodiment of the present invention.

Figure 23A:
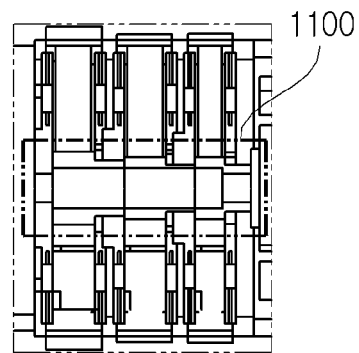
Figure 23A:
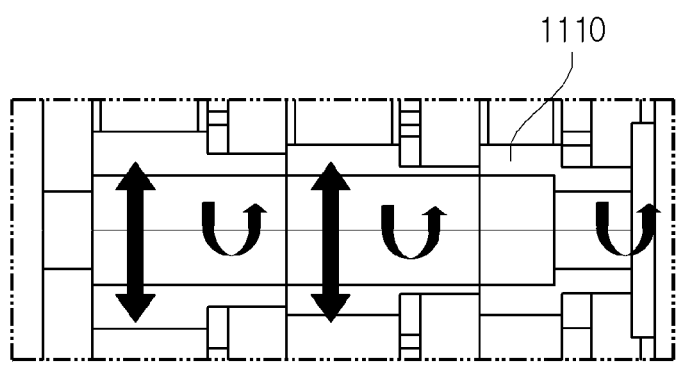

FIG. 23B is an enlarged view of the portion 1100 illustrated in FIG. 23A.

Referring to FIG. 3, in multi-step planetary gear sets, the other sun gears except the first sun gear 1110 directly connected with a motor are not aligned with the output shaft of the motor in many cases. Accordingly, as illustrated in FIG. 23B, they are likely to shake by moving along surfaces to be eccentric after brought in surface contact. A problem about a gap and the coaxial degree is generated at the output end due to accumulated tolerances between the parts, such that the entire noise of the reduction gear increases and efficiency is decreased, when they are shaken, as illustrated in FIG. 23B.

Figure 24A:
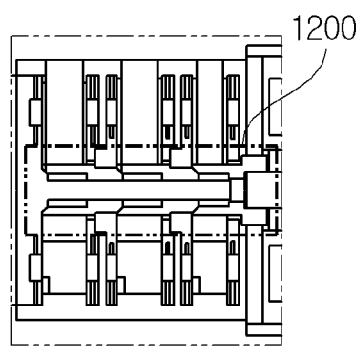
Figure 24B:
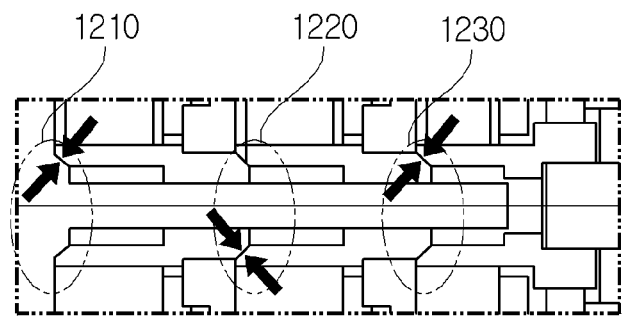

FIG. 24B is an enlarged view of the portion 1200 illustrated in FIG. 24A.

Referring to FIGS. 24A and 24B, the parts were made in the present invention not to deviate from the coaxial positions by contact between inclined surfaces, by forming wedges between the parts in order to prevent misalignment of the parts due to surface contact of the multi-step planetary gear. It is possible to keep the sun gears coaxially aligned, by maintaining appropriate tolerances between the parts.

Figure 25:
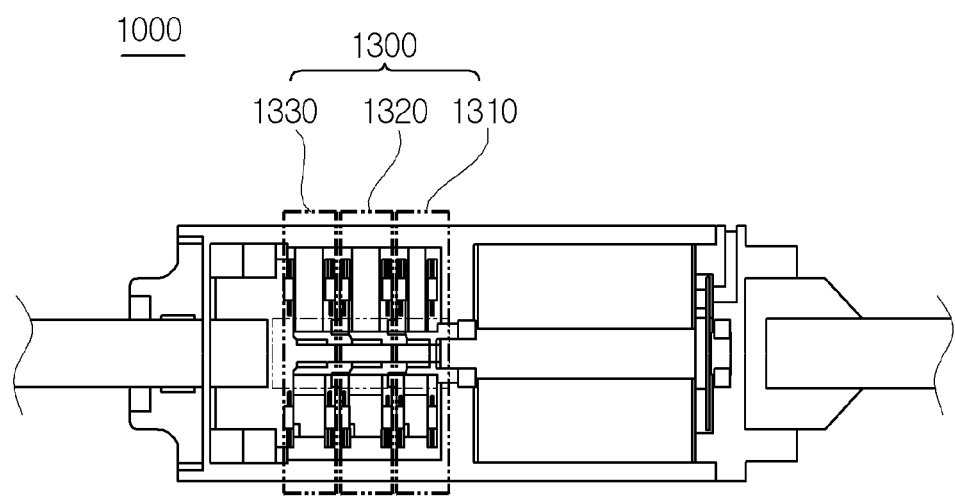
FIGS. 25 to 26C are reference views illustrating features of a multi-step planetary gear set in the actuator according to the third exemplary embodiment.
Figure 26A:
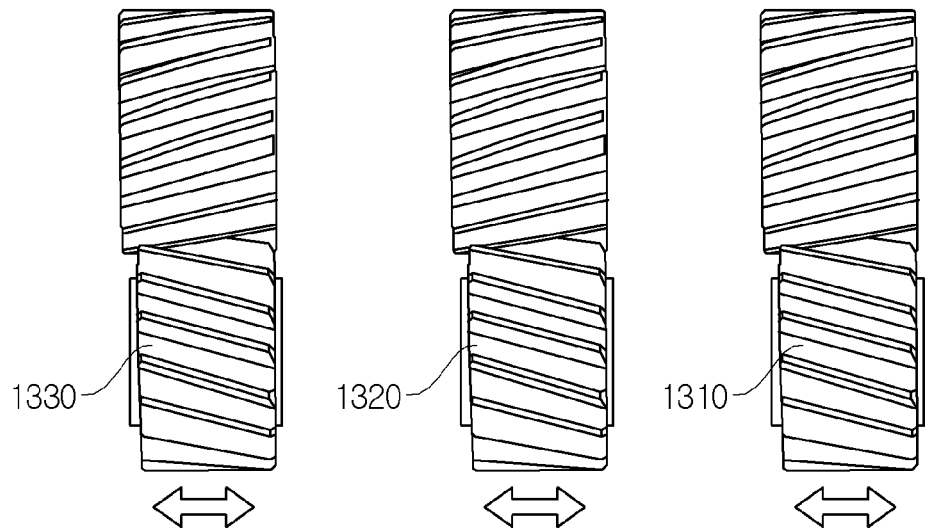
Figure 26B:
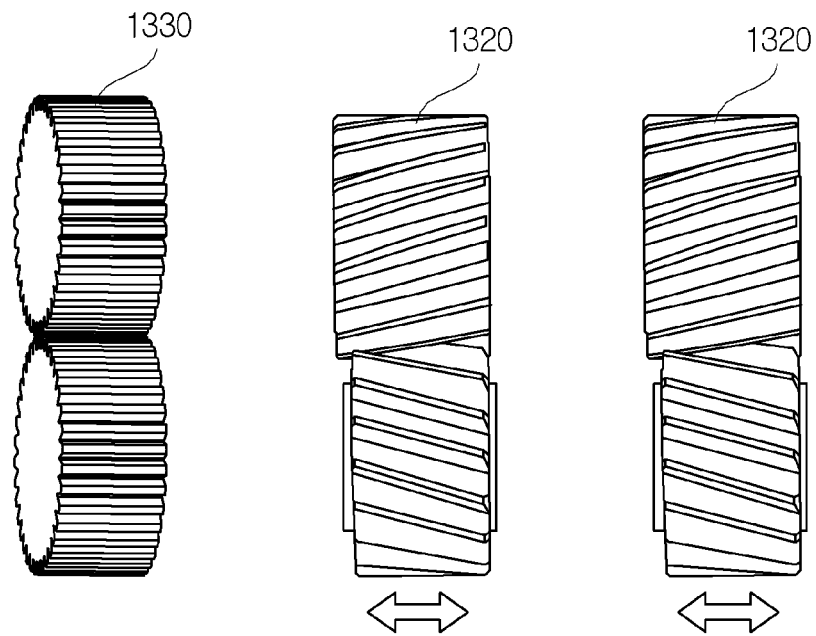
Figure 26C:
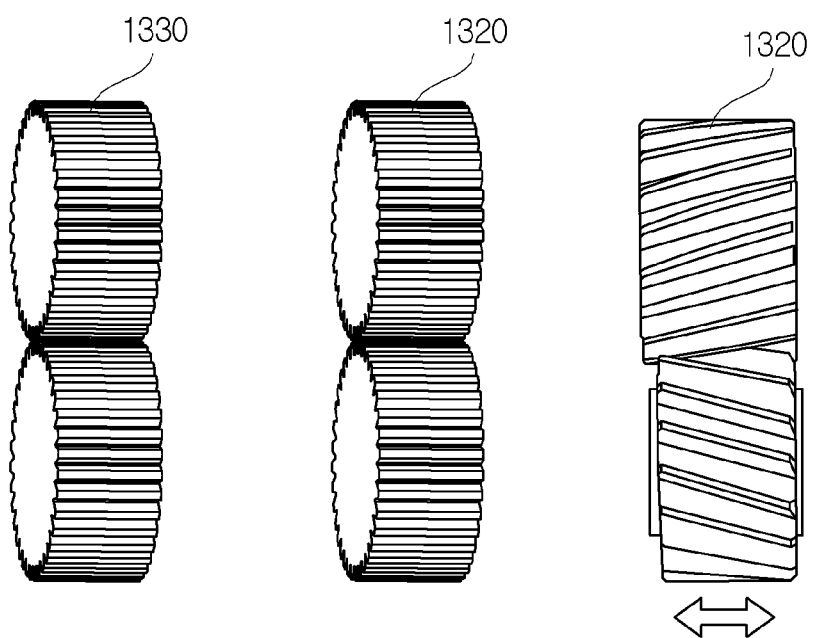

FIGS. 25 to 26B are reference views illustrating features of a multi-step planetary gear set in the actuator according to the third exemplary embodiment.

When the multi-step planetary gear set 1300 is composed of helical gears, a thrust force is generated, depending on the rotational direction, because of the helix angles of the helical gears. Configuring the multi-step planetary gear set 1300, as described above, is advantageous in terms of noise and vibration, but has a problem of an axial load due to the thrust force. The thrust force can be canceled, depending on the helix angles, but cannot be removed, such that the gaps are likely to be increased due to side effects such as friction between the parts, which increases the weight and the cost to increase stiffness of the parts around.

In the present invention, it is possible to remove a thrust at the gears with large torque by using a spur gear only for the third gear 1300 with large torque and less rotation in comparison to the first gear 1310 and the second gear 1320, or using spur gears for the second gear 1320 and the third gear 1330.

Using helical gears for all of the first gear 1310 to the third gear 1330 is advantageous in terms of the contact ratio, but causes backlash and influences the parts around due to an axial thrust force, such that it is possible to solve the problem of noise and remove a thrust force generated by the gears by using spur gears only for the third gear or the second and third gears with a small number of revolutions and large torque in the gears, and to reduce the weight and the cost by disposing the parts for ensuring stiffness at the right positions. Further, it is easier to machine a spur gear than a helical gear and it is possible to easily assemble the gears.

The multi-step planetary gear set described above is not limited to the use in the actuator according to the third exemplary embodiment and may be used for the actuator according to the first exemplary embodiment or the actuator according to the second exemplary embodiment. Further, it may be used for the actuator according to the fourth exemplary embodiment to be described hereafter.

The actuator according to the fourth exemplary embodiment includes a fixed stabilizer bar, a rotary stabilizer bar, a multi-step planetary gear set, and a motor and further includes at least one of the backlash reduction mechanism according to the first exemplary embodiment, the torsion damper according to the second exemplary embodiment, and the coaxially-aligning part according to the third exemplary embodiment.

In the actuator according to the fourth exemplary embodiment, the fixed stabilizer bar, rotary stabilizer bar, multi-step planetary gear set, motor, and backlash reduction mechanism have the same functions as those of the actuator according to the first exemplary embodiment and they are not described in detail.

The torsion damper in the actuator according to the fourth exemplary embodiment performs the same function as that of the torsion damper in the actuator according to the second exemplary embodiment and the detailed description is not provided herein.

The coaxially-aligning part in the actuator according to the fourth exemplary embodiment performs the same function as that of the torsion damper in the actuator according to the third exemplary embodiment and the detailed description is not provided herein.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An actuator of a vehicle, comprising:
    a fixed stabilizer bar fixed to a side of a housing;
    a rotary stabilizer bar rotatably coupled to the other side of the housing;
    a multi-step planetary gear set including a sun gear, a planetary gear, and a carrier and disposed in the housing;
    a motor including a stator generating a magnetic force when power is supplied, and a rotor rotated by the magnetic force, and disposed in the housing; and
    a backlash reduction mechanism controlling backlash of a reduction gear for reducing a gap between the fixed stabilizer bar and the rotary stabilizer bar by applying a load to the sun gear.

2. The actuator of claim 1, wherein the backlash reduction mechanism includes:
    a lock nut fitted on one end of the fixed stabilizer bar;
    a push rod being in close contact with one end of the sun gear through the motor; and
    a spring being in contact with the lock nut at one end and with the push rod at the other end and applying a load by an elastic force to the lock nut and the push rod.

3. The actuator of claim 2, wherein the backlash reduction mechanism further includes a ball inserted between the lock nut and the spring and supporting rotation of the push rod.

4. The actuator of claim 1, wherein the rotary stabilizer bar is fitted on the shaft inside of the fixed stabilizer bar by a bearing.

5. The actuator of claim 1, wherein the multi-step planetary gear set is connected to the rotary stabilizer bar in the housing, and the motor is disposed between the fixed stabilizer and the multi-step planetary gear set in the housing.

6. The actuator of claim 1, wherein the carrier fixes the planetary gear and is supported by a bearing.

7. A backlash reduction mechanism comprising:
a lock nut fitted on one end of a fixed stabilizer bar fixed to a side of a housing;
a push rod in close contact with one end of a sun gear of a multi-step planetary gear set through a motor, the multi-step planetary gear set comprising the sun gear, a planetary gear and a carrier, the multi-step planetary gear set disposed in the housing; and
a spring in contact with the lock nut at one end and with the push rod at the other end, the spring applying a load by an elastic force to the lock nut and the push rod,
wherein the backlash reduction mechanism controls backlash of a reduction gear for reducing a gap between the fixed stabilizer bar, and a rotary stabilizer bar by applying a load to the sun gear, the rotary stabilizer is rotatably coupled to a side of the housing other than the side having the fixed stabilizer bar.

* * * * *